United States Patent
Hashimoto et al.

(10) Patent No.: US 12,249,245 B2
(45) Date of Patent: Mar. 11, 2025

(54) INTERMEDIATION DEVICE AND INTERMEDIATING METHOD USING THE SAME

(71) Applicant: KAWASAKI JUKOGYO KABUSHIKI KAISHA, Hyogo (JP)

(72) Inventors: Yasuhiko Hashimoto, Kobe (JP);
Masayuki Kamon, Akashi (JP);
Shigetsugu Tanaka, Akashi (JP);
Yoshihiko Maruyama, Osaka (JP)

(73) Assignee: KAWASAKI JUKOGYO KABUSHIKI KAISHA, Hyogo (JP)

( * ) Notice: Subject to any disclaimer, the term of this patent is extended or adjusted under 35 U.S.C. 154(b) by 963 days.

(21) Appl. No.: 17/267,476

(22) PCT Filed: Aug. 9, 2019

(86) PCT No.: PCT/JP2019/031678
§ 371 (c)(1),
(2) Date: Feb. 9, 2021

(87) PCT Pub. No.: WO2020/032264
PCT Pub. Date: Feb. 13, 2020

(65) Prior Publication Data
US 2021/0323168 A1   Oct. 21, 2021

(30) Foreign Application Priority Data

Aug. 10, 2018  (JP) .................................. 2018-151917
Jun. 5, 2019   (JP) .................................. 2019-105749
Jun. 5, 2019   (JP) .................................. 2019-105750

(51) Int. Cl.
*G09B 19/00*      (2006.01)
*G05B 19/418*     (2006.01)
(Continued)

(52) U.S. Cl.
CPC ....... *G09B 19/00* (2013.01); *G05B 19/41865* (2013.01); *G06Q 10/06311* (2013.01); *G06Q 10/063112* (2013.01); *G09B 19/24* (2013.01)

(58) Field of Classification Search
None
See application file for complete search history.

(56) References Cited

U.S. PATENT DOCUMENTS 6,859,523 B1 * 2/2005  Jilk .................. G06Q 10/06
                                          379/265.06
9,786,202 B2 * 10/2017 Huang ................ G09B 23/28
(Continued)

FOREIGN PATENT DOCUMENTS

JP  2007183332 A   7/2007
JP  2009178820 A   8/2009
(Continued)

OTHER PUBLICATIONS

G. Soros, B. Resko and P. Baranyi, "Cognitive supervision system for industrial robots," 2009 2nd Conference on Human System Interactions, Catania, Italy, 2009, pp. 416-420, doi: 10.1109/HSI.2009.5091016. (Year: 2009).*

*Primary Examiner* — Matheus Ribeiro Stivaletti
(74) *Attorney, Agent, or Firm* — Studebaker Brackett PLLC

(57) ABSTRACT

An intermediation device (2) receives, from a plurality of robots (5), recruitments of remote workers who operate the plurality of robots (5) and perform a plurality of works. The intermediation device (2) posts the recruitments of the remote workers who perform the plurality of works on a site on a network (4) of an intermediary who holds the intermediation device (2). When the plurality of remote workers access the site from a plurality of manipulation terminals (3) and send a plurality of applications for the recruitments of the remote workers who perform the plurality of works, the (Continued)

intermediation device (2) selects, based on the plurality of applications, one or more robots (5) and one or more manipulation terminals (3) as one or more selected robots (5) and one or more selected manipulation terminals (3). The intermediation device (2) connects the one or more selected manipulation terminals (3) to the one or more selected robots (5) so that the one or more selected robots (5) are manipulatable by the one or more selected manipulation terminals (3).

46 Claims, 23 Drawing Sheets

(51) Int. Cl.
*G06Q 10/0631* (2023.01)
*G09B 19/24* (2006.01)

(56) References Cited

U.S. PATENT DOCUMENTS

| | | | |
|---|---|---|---|
| 2010/0241693 A1* | 9/2010 | Ando | G06Q 30/06 |
| | | | 901/1 |
| 2014/0031983 A1 | 1/2014 | Low et al. | |
| 2015/0293596 A1* | 10/2015 | Krausen | A61B 34/37 |
| | | | 606/130 |
| 2019/0097772 A1* | 3/2019 | Yang | H04B 7/0695 |
| 2020/0233436 A1* | 7/2020 | Fox | G05D 1/0289 |
| 2020/0258232 A1* | 8/2020 | Miyamoto | G06T 7/11 |

FOREIGN PATENT DOCUMENTS

| | | |
|---|---|---|
| JP | 2014014900 A | 1/2014 |
| JP | 2017061032 A | 3/2017 |
| KR | 20-0320700 Y1 | 7/2003 |
| WO | 2008140011 A1 | 11/2008 |

* cited by examiner

| RECRUITMENT | APPLICATION | TRAINING | TEACHING | EVENT |

| \multicolumn{3}{c}{RECRUITMENT GUIDELINE} |
|---|---|---|
| NO. | ITEM | CONTENT |
| 1 | RECRUITER | NAME OF HOLDER OF ROBOT |
| 2 | ROBOT TYPE | ARTICULATED ROBOT, PARALLEL-LINK ROBOT, ETC. |
| 3 | CONTENT OF WORK | COMPONENT ASSEMBLY, COMPONENT CONVEYANCE, PAINTING, PICKING, ETC. |
| 4 | WORK MODE | RATIO OF NUMBER OF OPERATORS AND NUMBER OF ROBOTS |
| 5 | WORK PERIOD | STARTING DATE AND ENDING DATE OF WORK (INCLUDING IMMEDIATE START) |
| 6 | WORK HOURS | START TIME AND END TIME OF WORK |
| 7 | FREE LEAVE ACCEPTANCE | WHETHER LEAVE FROM WORK BY NOTICE IS ACCEPTED |
| 8 | REWARD | AMOUNT OF PAY PER WORK |
| 9 | SKILL LEVEL | SKILL LEVEL NEEDED FOR WORK |
| 10 | QUALIFICATION | QUALIFICATION REQUIRED FOR WORK |
| 11 | NUMBER OF PERSON TO BE HIRED | NUMBER OF PERSONS ACCORDING TO NUMBER OF WORKS AND WORK MODE |
| 12 | HIRING METHOD | ORDER OF APPLICATIONS, FIT SELECTION, AUCTION, ETC. |
| 13 | WORK DIFFICULTY | DIFFICULTY OF WORK (OPTIONAL) |
| \multicolumn{2}{l}{CURRENT COMPETITIVE RATIO OR NUMBER OF WAITING PERSON(S)} | RATIO OF NUMBER OF APPLICANTS TO NUMBER OF PERSON(S) TO BE HIRED OR NUMBER OF WAITING PERSON(S) FOR COMMENCED WORK |

FIG. 8

| | | 81 |
|---|---|---|
| ROBOT TYPE<br>ARTICULATED ROBOT ⌄ | CONTENT OF WORK<br>COMPONENT ASSEMBLY ⌄ | WORK MODE<br>OPERATOR 1 : ROBOT 1 ⌄ |
| WORK PERIOD<br>YEAR/ MONTH/ DAY | WORK HOURS<br>HOUR:MINUTE TO HOUR:MINUTE ⌄ | FREE LEAVE ACCEPTANCE<br>ACCEPTABLE ⌄ |
| REWARD<br>1,000 JPY ≤, < 2,000 JPY ⌄ | SKILL LEVEL<br>A ⌄ | QUALIFICATION<br>1ST GRADE ⌄ |
| NUMBER OF PERSON(S) TO BE HIRED<br>1 PERSON ≤, < 10 PERSONS ⌄<br>10 PERSONS ≤, < 100 PERSONS<br>100 PERSONS ≤, < 1,000 PERSONS<br>1,000 PERSONS ≤ | HIRING METHOD<br>ORDER OF APPLICATIONS ⌄<br><br>KEY WORD<br>(OPTIONAL) | WORK DIFFICULTY<br>"DIFFICULT" ⌄<br><br>🔍 SEARCH |

FIG. 9

| | | APPLICATION |
|---|---|---|
| NO. | ITEM | CONTENT |
| 1 | APPLICANT | NAME OF HOLDER OF MANIPULATION TERMINAL |
| 2 | ROBOT TYPE | ARTICULATED ROBOT |
| 3 | CONTENT OF WORK | COMPONENT ASSEMBLY |
| 4 | WORK MODE | OPERATOR 1 : ROBOT 1 |
| 5 | WORK PERIOD | IMMEDIATE START |
| 6 | WORK HOURS | START TIME 14:00  END TIME 16:00 |
| 7 | FREE LEAVE ACCEPTANCE | ACCEPTABLE |
| 8 | REWARD | 1,000 JPY |
| 9 | SKILL LEVEL | A |
| 10 | QUALIFICATION | 1ST GRADE |
| 11 | NUMBER OF PERSON TO BE HIRED | 100 PERSONS |
| 12 | HIRING METHOD | ORDER OF APPLICATIONS |
| 13 | WORK DIFFICULTY | "NORMAL" |
| 14 | MANIPULATION DEVICE TYPE | MODEL NAMES OF GAME CONTROLLER, SMARTPHONE, DEDICATED MANIPULATION TERMINAL, ETC. |
| 15 | ALLOWABLE COMP. RATIO OR NUMBER OF WAIT. PERS. | NUMBER OF WAITING PERSON(S) : 1 PERSON |

FIG. 10

| No. | ACTIONS FOR LIBERTY OF WORKING |
|---|---|
| 1 | WORK HOURS CAN BE SPECIFIED. |
| 2 | BY MANIPULATION TERMINAL NOTIFYING TO INTERMEDIATION DEVICE, OPERATOR CAN LEAVE FROM WORK. |
| 3 | RECRUITMENT IS CONTINUED UNTIL ENDING OF WORK. |
| 4 | EXCESS AND DEFICIENCY OF NUMBER OF APPLICANTS TO NUMBER OF PERSONS TO BE HIRED ARE DISPLAYED ON RECRUITMENT GUIDANCE. |

| | RECRUITMENT GUIDELINE | |
|---|---|---|
| NO. | ITEM | CONTENT |
| 1 | RECRUITER | NAME OF HOLDER OF ROBOT |
| 2 | ROBOT TYPE | ARTICULATED ROBOT, PARALLEL-LINK ROBOT, ETC. |
| 3 | CONTENT OF WORK | COMPONENT ASSEMBLY, COMPONENT CONVEYANCE, PAINTING, PICKING, ETC. |
| 4 | WORK MODE | RATIO OF NUMBER OF OPERATORS AND NUMBER OF ROBOTS |
| 5 | WORK PERIOD | STARTING DATE AND ENDING DATE OF WORK (INCLUDING IMMEDIATE START) |
| 6 | WORK HOURS | START TIME AND END TIME OF WORK |
| 7 | FREE LEAVE ACCEPTANCE | WHETHER LEAVE FROM WORK BY NOTICE IS ACCEPTED |
| 8 | REWARD | AMOUNT OF PAY PER WORK |
| 9 | SKILL LEVEL | SKILL LEVEL NEEDED FOR WORK |
| 10 | QUALIFICATION | QUALIFICATION REQUIRED FOR WORK |
| 11 | NUMBER OF PERSON TO BE HIRED | NUMBER OF PERSONS ACCORDING TO NUMBER OF WORKS AND WORK MODE |
| 12 | HIRING METHOD | ORDER OF APPLICATIONS, FIT SELECTION, AUCTION, ETC. |
| 13 | WORK DIFFICULTY | DIFFICULTY OF WORK (OPTIONAL) |

FIG. 15

| | | JOB APPLICATION |
|---|---|---|
| NO. | ITEM | CONTENT |
| 1 | PERSON TO BE EMPLOYED | NAME OF HOLDER OF MANIPULATION TERMINAL |
| 2 | ROBOT TYPE | DESIRED ROBOT TYPE |
| 3 | CONTENT OF WORK | DESIRED WORK CONTENT |
| 4 | WORK MODE | DESIRED RATIO OF NUMBER OF OPERATORS AND NUMBER OF ROBOTS |
| 5 | WORK PERIOD | STARTING DATE AND ENDING DATE OF WORKING (INCLUDING IMMEDIATE START) |
| 6 | WORK HOURS | START TIME AND END TIME OF WORKING |
| 7 | FREE LEAVE ACCEPTANCE | WHETHER LEAVE FROM WORK BY NOTICE IS ACCEPTED |
| 8 | REWARD | DESIRED AMOUNT OF PAY (PER WORK) |
| 9 | SKILL LEVEL | OWN SKILL LEVEL |
| 10 | QUALIFICATION | HELD QUALIFICATION |
| 11 | HIRING METHOD | DESIRED HIRING METHOD |
| 12 | WORK DIFFICULTY | DESIRED DIFFICULTY OF WORK (OPTIONAL) |
| 13 | MANIPULATION DEVICE TYPE | MODEL NAMES OF GAME CONTROLLER, SMARTPHONE, DEDICATED MANIPULATION TERMINAL, ETC. |

FIG. 16

| OPERATION KEY OF GAME CONTROLLER | |
|---|---|
| KEY NAME | FUNCTION FOR GAME |
| CROSS KEY | MOVE MANIPULATION TARGET IN TWO AXIAL DIRECTIONS |
| LEFT JOYSTICK | MOVE MANIPULATION TARGET IN TWO-DIMENSIONAL DIRECTION |
| RIGHT JOYSTICK | MOVE VIEWPOINT OF GAME SPACE |
| 1ST MULTIPURPOSE KEY | APPROVE SETTING |
| 2ND MULTIPURPOSE KEY | CANCEL SETTING |
| 3RD MULTIPURPOSE KEY | ATTACK TARGET |
| 4TH MULTIPURPOSE KEY | ATTACK TARGET |
| LEFT COMMAND KEY | ACHIEVE PLURALITY OF GIVEN OPERATIONS BY SINGLE OPERATION |
| RIGHT COMMAND KEY | ACHIEVE PLURALITY OF GIVEN OPERATIONS BY SINGLE OPERATION |

FIG. 20

| MANIPULATION KEY OF ROBOT MANIPULATION DEVICE | | |
|---|---|---|
| KEY NAME | FUNCTION FOR ROBOT MANIPULATION | CORRESPONDING OPERATING COMMAND |
| 1ST AXIS KEY | MOVE 1ST AXIS OF ROBOT IN INDIVIDUAL AXIS MODE | 1ST AXIS OPERATING COMMAND |
| 2ND AXIS KEY | MOVE 2ND AXIS OF ROBOT IN INDIVIDUAL AXIS MODE | 2ND AXIS OPERATING COMMAND |
| 3RD AXIS KEY | MOVE 3RD AXIS OF ROBOT IN INDIVIDUAL AXIS MODE | 3RD AXIS OPERATING COMMAND |
| 4TH AXIS KEY | MOVE 4TH AXIS OF ROBOT IN INDIVIDUAL AXIS MODE | 4TH AXIS OPERATING COMMAND |
| 5TH AXIS KEY | MOVE 5TH AXIS OF ROBOT IN INDIVIDUAL AXIS MODE | 5TH AXIS OPERATING COMMAND |
| 6TH AXIS KEY | MOVE 6TH AXIS OF ROBOT IN INDIVIDUAL AXIS MODE | 6TH AXIS OPERATING COMMAND |
| ROBOT CONTROL MODE SWITCH KEY | SWITCH CONTROL MODE OF ROBOT BETWEEN INDIVIDUAL AXIS MODE, WORLD MODE, AND TOOL MODE | ROBOT CONTROL MODE SWITCH COMMAND |
| TOOL CONTROL MODE SWITCH KEY | SWITCH CONTROL MODE OF TOOL | TOOL CONTROL MODE SWITCH COMMAND |
| TOOL ON-OFF KEY | TURN ON/OFF TOOL | TOOL ON-OFF COMMAND |
| TOOL MANIPULATION KEY | MANIPULATE TOOL | TOOL OPERATING COMMAND |

FIG. 21

| ASSIGNMENT OF OPERATION KEY OF GAME CONTROLLER TO ROBOT OPERATING COMMAND IN INDIVIDUAL AXIS MODE | |
|---|---|
| KEY NAME | ROBOT OPERATING COMMAND |
| CROSS KEY | 1ST AXIS OPERATING COMMAND<br>2ND AXIS OPERATING COMMAND |
| LEFT JOYSTICK | 3RD AXIS OPERATING COMMAND<br>4TH AXIS OPERATING COMMAND |
| RIGHT JOYSTICK | 5TH AXIS OPERATING COMMAND<br>6TH AXIS OPERATING COMMAND |
| 1ST MULTIPURPOSE KEY | ROBOT CONTROL MODE SWITCH COMMAND |
| 2ND MULTIPURPOSE KEY | TOOL CONTROL MODE SWITCH COMMAND |
| 3RD MULTIPURPOSE KEY | TOOL ON-OFF COMMAND |
| 4TH MULTIPURPOSE KEY | TOOL OPERATING COMMAND |
| LEFT COMMAND KEY | NOT ASSIGNED |
| RIGHT COMMAND KEY | NOT ASSIGNED |

FIG. 22

| ASSIGNMENT OF OPERATION KEY OF GAME CONTROLLER TO ROBOT OPERATING COMMAND IN CASE OF INDEPENDENT KEY OPERATION IN WORLD MODE | |
|---|---|
| KEY NAME | ROBOT OPERATING COMMAND |
| CROSS KEY | X-AXIS POSITION COMMAND<br>Y-AXIS POSITION COMMAND |
| LEFT JOYSTICK | X-AXIS ROTATION COMMAND<br>Y-AXIS ROTATION COMMAND |
| RIGHT JOYSTICK | Z-AXIS ROTATION COMMAND |
| 1ST MULTIPURPOSE KEY | ROBOT CONTROL MODE SWITCH COMMAND |
| 2ND MULTIPURPOSE KEY | TOOL CONTROL MODE SWITCH COMMAND |
| 3RD MULTIPURPOSE KEY | TOOL ON-OFF COMMAND |
| 4TH MULTIPURPOSE KEY | TOOL OPERATING COMMAND |
| LEFT COMMAND KEY | Z-AXIS POSITIVE POSITION COMMAND |
| RIGHT COMMAND KEY | Z-AXIS NEGATIVE POSITION COMMAND |

FIG. 23

| ASSIGNMENT OF OPERATION KEY OF GAME CONTROLLER TO ROBOT OPERATING COMMAND IN CASE OF PLURAL KEY CONCURRENT OPERATION IN WORLD MODE | |
|---|---|
| KEY NAME | ROBOT OPERATING COMMAND |
| CROSS KEY | NOT ASSIGNED |
| LEFT JOYSTICK | NOT ASSIGNED |
| RIGHT JOYSTICK | NOT ASSIGNED |
| 1ST MULTIPURPOSE KEY AND 2ND MULTIPURPOSE KEY | 1ST COMMAND: AUTOMATICALLY MOVE TOOL IN X-AXIS DIRECTION BY FIRST OPERATION, AND STOP TOOL BY SECOND OPERATION |
| 3RD MULTIPURPOSE KEY AND 4TH MULTIPURPOSE KEY | 2ND COMMAND: AUTOMATICALLY MOVE TOOL IN Y-AXIS DIRECTION BY FIRST OPERATION, AND STOP TOOL BY SECOND OPERATION |
| LEFT COMMAND KEY AND RIGHT COMMAND KEY | 3RD COMMAND: AUTOMATICALLY MOVE TOOL IN Z-AXIS DIRECTION BY FIRST OPERATION, AND STOP TOOL BY SECOND OPERATION |

FIG. 24

| ASSIGNMENT OF OPERATION KEY OF GAME CONTROLLER TO ROBOT OPERATING COMMAND IN TOOL MODE | |
|---|---|
| KEY NAME | ROBOT OPERATING COMMAND |
| CROSS KEY | O-AXIS POSITION COMMAND<br>A-AXIS POSITION COMMAND |
| LEFT JOYSTICK | T-AXIS POSITION COMMAND |
| RIGHT JOYSTICK | NOT ASSIGNED |
| 1ST MULTIPURPOSE KEY | ROBOT CONTROL MODE SWITCH COMMAND |
| 2ND MULTIPURPOSE KEY | TOOL CONTROL MODE SWITCH COMMAND |
| 3RD MULTIPURPOSE KEY | TOOL ON-OFF COMMAND |
| 4TH MULTIPURPOSE KEY | TOOL OPERATING COMMAND |
| LEFT COMMAND KEY | NOT ASSIGNED |
| RIGHT COMMAND KEY | NOT ASSIGNED |

FIG. 25

INTERMEDIATION DEVICE AND INTERMEDIATING METHOD USING THE SAME

TECHNICAL FIELD

The present disclosure relates to an intermediation device and an intermediating method using the same.

BACKGROUND ART

Conventionally, robots which are controlled remotely are known. For example, in a remote manipulator system disclosed in Patent Document 1, a robot manipulator is operated by an operator at a remote-control station.

Reference Document of Conventional Art

Patent Document

[Patent Document 1] JP2017-061032A

DESCRIPTION OF THE DISCLOSURE

Problem to be Solved by the Disclosure

Meanwhile, robots including the remote control robots described above have not been used widely in society. Therefore, it is necessary to expand the utilization of the remote control robots.

The present disclosure is made in view of solving such a problem, and one purpose thereof is to provide an intermediation device and an intermediating method using the same, which can expand utilization of a remote control robot.

SUMMARY OF THE DISCLOSURE

The present inventors diligently examined the problem described above. As a result, they acquired the following knowledge.

In order to expand the utilization of the remote control robots, it is necessary not only to expand the field of application of the robots, but also to increase the opportunity that more people in society other than those involved in the manufacturing industry touch the robots.

In society, there are people who are not employed (hereinafter, referred to as "the specific unemployed") because of unavoidable situations, such as raising children, nursing, illness, handicap, and weakening of physical strength. Among them, for example, like there are some gamers (game players) who have exceptionally-excellent skills in the game about operating a game controller, it is assumed that there are also some people who have exceptionally-excellent skills about the robot manipulation.

Therefore, the present inventors reached such thought that opportunities are to be created for them to touch the robots to let them contribute the society.

In detail, for example, they manipulate industrial robots through the Internet by using a game controller while being at home, and get paid for the work. In general, a manipulation device of the industrial robot is not available for normal person because it is a highly-sophisticated and expensive communicator. On the other hand, a game controller is available for the normal person at about several tens of thousands JPY because it is a relatively low-tech manipulation device using key operation. Further, if the manipulation signal by the key operation at the game controller can be converted into an operating command for the industrial robot, the operator of the game controller can well operate the robot through the signal conversion.

According to a system of such a way of work (hereinafter, referred to as a "robot work working system"), the specific unemployed can be made contribute to the actual world. Note that the specific unemployed can get income while being at home. Meanwhile, it is said that the population of gamers is several times the population in the manufacturing industries. Therefore, according to the robot work working system, the robot manufacturer can build a social infrastructure for remote-controlled robots as they intend.

Moreover, when the specific unemployed is a gamer, he/she can remarkably improve the productivity of the work with the robot by utilizing the enthusiasm and skills. In other words, those people who are enthusiastic to games are made to participate in the robot's world and they are motivated so as to be enthusiastic, thereby remarkably improving their skills for operating the robots.

The present disclosure is made based on such a knowledge.

In order to achieve the purpose described above, an intermediation device according to one aspect of the present disclosure is held by an intermediary and connected to a plurality of manipulation terminals operated by a plurality of remote workers and a plurality of robots held by one or more robot holders through a network in which data communication is possible. The intermediation device receives, from the plurality of robots, recruitments of the remote workers who operate the plurality of robots and perform a plurality of works. The intermediation device posts the recruitments of the remote workers who perform the plurality of works on a site on the network of the intermediary who holds the intermediation device. When the intermediation device receives applications for the recruitments, through the site, from the plurality of manipulation terminals, the intermediation device selects, based on the plurality of applications, one or more robots and one or more manipulation terminals as one or more selected robots and one or more selected manipulation terminals. The intermediation device connects the one or more selected manipulation terminals to the one or more selected robots so that the one or more selected robots are manipulatable by the one or more selected manipulation terminals.

The phrase "a plurality of robots held by one or more robot holders" as used herein includes a case where "one robot holder" holds a plurality of robots, and a case where each of "a plurality of robot holders" holds one robot. The phrase "connecting the one or more selected manipulation terminals to the one or more selected robots so that the one or more selected robots are manipulatable by the one or more selected manipulation terminals" means that a state where the one or more selected manipulation terminals and the one or more selected robots are able to perform the data communication through the intermediation device is established, and a manipulation signal of a manipulation key of the selected manipulation terminal is converted into an operating command of the selected robot, if needed.

Moreover, the "robot" is at least either an industrial robot or a service robot, but it is not a robot for amusement. This is because one of the purposes of the present disclosure is to make the specific unemployed contribute the society. Note that a medical-application robot may be excluded from the "robot." This is because, in order to operate the medical-application robot, qualification(s), technical knowledge, etc. related to medical science may be required.

According to this configuration, the manipulation terminal (and the remote worker) is available as an infrastructure for making robot disseminate, and opportunities for obtaining a reward by operating the manipulation terminal can be given to the remote worker. As a result, the utilization of a remote control robot can be expanded.

The intermediation device may connect, according to a mode of the plurality of works, the one or more selected manipulation terminals to the one or more selected robots in a relation in which a ratio of the one or more selected manipulation terminals and the one or more selected robots is at least one of 1:1, n:1 (n is a natural number of two or larger), 1:m (m is a natural number of two or larger), and n:m.

According to this configuration, various ways of work are possible for the robot.

The intermediation device may determine for one of the recruitments, according to items of the recruitment for the remote workers who perform the plurality of works, the one or more selected manipulation terminals and the one or more selected robots, in an order of receiving the applications, or by a selection from the plurality of applications.

According to this configuration, options for securing the remote workers can be provided to the robot holders, such as immediate securing of the remote workers, securing of high skilled remote workers, and reducing costs by an auction, etc. of the works.

The intermediation device may connect the one or more selected manipulation terminals to the one or more selected robots, immediately or at a time in the future, according to a work period presented in the recruitment corresponding to each of the selected robots.

According to this configuration, the remote workers can work whenever they want, by selecting the work period.

The intermediation device may disconnect the one or more selected manipulation terminals from the one or more selected robots according to respective notices from the one or more selected manipulation terminals.

According to this configuration, the remote workers can quit the work whenever they want, by notifying it to the intermediation device.

Items of the recruitments for the remote workers who perform the plurality of works may include information related to a content of each of the plurality of works, a level of skill required for each of the plurality of works, and a reward for each of the plurality of works.

According to this configuration, the remote workers can appropriately select the work.

The intermediation device may receive information related to the type of the robot related to the recruitment from the robot, and receive information related to the type of the manipulation terminal related to the application from the manipulation terminal.

According to this configuration, the intermediation device can convert the manipulation signal of the manipulation terminal to a manipulation signal of the robot, according to the type of the robot (model name) and the type of the manipulation terminal (model name).

The plurality of the manipulation terminals may be at least any of a game machine, a game controller, a remote controller dedicated for the robot, a personal digital assistant, a smartphone, a personal computer, and a tablet.

According to this configuration, if the manipulation terminals are existing manipulation terminals other than remote controllers dedicated for robots, the manipulation terminals can effectively be used as an infrastructure for disseminating robots. On the other hand, if the manipulation terminals are the remote controllers dedicated for robots, since the conversion of the manipulation signal is not necessary, the manipulation terminals with high operating efficiency can be provided.

The intermediation device may manage a system related to qualifications required for the plurality of works or a ranking system in which the remote workers who perform the plurality of works are ranked.

According to this configuration, the remote workers can be made more competitive.

The intermediation device may manage a training meeting for acquiring the qualification.

According to this configuration, opportunities to improve their capability can be given to the remote workers.

The intermediation device may give a training or a simulation for a manipulation of the robot.

According to this configuration, the remote workers can be given the training or can perform the simulation so as to well manipulate the robot.

The intermediation device may manage an event where the plurality of remote workers gather.

According to this configuration, a system in which the robot(s) is remote-controlled by the manipulation terminals can be widely recognized to the society.

Each of the plurality of robots may operate according to an operating command including an individual operating command. Each of the plurality of manipulation terminals may be provided with a manipulation key. When a manipulation signal corresponding to the manipulation key is received from the selected manipulation terminal for the selected manipulation terminal and the selected robot connected with each other among the one or more selected manipulation terminals and the one or more selected robots, the intermediation device may convert the manipulation signal into the individual operating command and send the individual operating command to the selected robot.

According to this configuration, when the intermediation device receives the manipulation signal cone sponding to the manipulation key of the manipulation terminal, since the intermediation device converts the manipulation signal into individual operating command in the operating command for the selected robot, and sends the individual operating command to the selected robot, the robot can be manipulated through the network and the intermediation device by operating the manipulation key of the selected manipulation terminal. Therefore, a robot work working system can be caused to function, and, as a result, the utilization of the remote control robot can be expanded.

The operating command may include one or more individual operating commands. The manipulation terminal may be provided with a plurality of manipulation keys. When one or more manipulation signals corresponding to the plurality of manipulation keys are received, the intermediation device may convert the one or more manipulation signals into one or more individual operating commands, and send the one or more individual operating commands to the robot.

According to this configuration, the one or more manipulation signals can be converted into the one or more individual operating commands corresponding to the plurality of the manipulation keys.

The plurality of manipulation keys may include a move key configured to move a manipulation target and a function key used for multiple purposes. The operating command may include, as the individual operating command, a position command for instructing a position of a wrist part of each of the robots, and an end effector operating command for controlling operation of an end effector attached to the wrist part of each of the robots. The intermediation device may convert the manipulation signal corresponding to the move key into the position command and convert the manipulation signal corresponding to the function key into the end effector operating command.

According to this configuration, since the position command for indicating the position of the wrist part of each robot corresponds to the manipulation signal of the move key which moves the manipulation target in a desired direction similar to it, the operator of the manipulation terminal can manipulate each robot, without feeling uncomfortable so much.

When the intermediation device receives a manipulation key change notice from the selected manipulation terminal, the intermediation device may change, according to the manipulation key change notice, the one or more individual operating commands to be changed from the one or more manipulation signals.

According to this configuration, the one or more individual operating command to be converted from the one or more manipulation signal can be changed so that the operator of the selected manipulation terminal can operate the manipulation key easily.

When the number of the plurality of manipulation keys of the selected manipulation terminal is short for the number of the one or more individual operating commands, the intermediation device may convert each of the manipulation signals corresponding to operation in a given mode of one or more manipulation keys among the plurality of manipulation keys into the one or more individual operating commands.

According to this configuration, the conversion of the manipulation signal to the individual operating command can be performed even if the number of manipulation keys of the manipulation terminal is short for the number of individual operating commands.

The intermediation device may convert at least any of the one or more manipulation signals into the one or more the individual operating commands for causing the selected robot to perform a plurality of operations.

According to this configuration, a command for causing the robot to perform a plurality of operations by the one or more individual operating commands can be generated. Examples of such a command include a "pick and place" command for causing the robot to lift a workpiece and place it at a given location, and a command for causing the robot to move a painting gun to a given location and discharge paint from the painting gun.

The intermediation device may convert at least any of the one or more the manipulation signals into one individual operating command for causing the selected robot to perform a plurality of operations.

According to this configuration, the command for causing the selected robot to perform a plurality of operations by one individual operating command can be generated. An example of such a command includes a command for causing the selected robot to position a workpiece with a fitting protrusion above a workpiece with a fitting hole, then lower the workpiece with the fitting protrusion, and fit the fitting protrusion into the fitting hole.

The intermediation device may convert at least any of the one or more manipulation signals into the individual operating command for switching a control mode of the selected robot.

According to this configuration, the control mode of the selected robot can be switched by operating the manipulation key of the manipulation terminal.

The intermediation device may request the selected manipulation terminal to determine a manipulation key assignment indicating how the plurality of manipulation keys are associated with the one or more individual operating commands, and convert the one or more manipulation signals corresponding to the plurality of manipulation keys into the one or more individual operating commands. The intermediation device may convert, according to the manipulation key assignment determined by the selected manipulation terminal, the one or more manipulation signals into the one or more individual operating commands.

According to this configuration, the operator of the selected manipulation terminal can determine in advance the manipulation key assignment before the conversion of the manipulation signal into the operating command so that he/she can operate easily.

The intermediation device may perform the conversion from the manipulation signal to the operating command based on a model name received from each of the selected manipulation terminal and the selected robot.

According to this configuration, based on the model names of the selected manipulation terminal and the selected robot, the conversion from the manipulation signal into the operating command can be performed suitably for the manipulation terminal and the robot.

The intermediation device may store patterns of the signal conversion according to the model names of the manipulation terminal and the robot, and perform the signal conversion while applying the pattern corresponding to the model names of the selected manipulation terminal and the selected robot.

According to this configuration, the conversion from the manipulation signal into the operating command can be performed with a simplified configuration suitably for the manipulation terminal and the robot.

An intermediation device according to another aspect of the present disclosure is held by an intermediary and connected to a plurality of manipulation terminals operated by a plurality of remote workers and a plurality of robots held by the one or more robot holders through a network in which data communication is possible. The intermediation device receives, from the plurality of robots, a recruitment guideline for the remote workers who operate the plurality of robots and perform a plurality of works. The intermediation device receives, from the plurality of manipulation terminals, job applications of the plurality of remote workers who operate the plurality of manipulation terminals. The intermediation device compares a plurality of recruitment guidelines with a plurality of job applications, and selects the one or more robots and the one or more manipulation terminals corresponding to the recruitment guidelines and the job applications satisfying items of each other, as one or more selected robots and one or more selected manipulation terminals. The intermediation device connects the one or more selected manipulation terminals to the one or more selected robots so that the one or more selected robots are manipulatable by the one or more selected manipulation terminals.

According to this configuration, the manipulation terminal (and the remote worker) can be utilized as an infrastructure for spreading robots, and opportunities for obtaining a reward by operating the manipulation terminal can also be given to the remote worker. As a result, the utilization of the remote control robot can be expanded.

According to still another aspect of the present disclosure, an intermediating method is provided, which uses an intermediation device held by an intermediary and connected to a plurality of manipulation terminals operated by a plurality of remote workers and a plurality of robots held by one or more robot holders through a network in which data communication is possible. The method includes the steps of receiving by the intermediation device, from the plurality of robots, recruitments of the remote workers who operate the plurality of robots and perform a plurality of works. The method includes the step of posting by the intermediation device, the recruitments of the remote workers who perform the plurality of works on a site on the network of the intermediary who holds the intermediation device. The method includes the step of, when the plurality of remote workers access the site from the plurality of manipulation terminals and send a plurality of applications for the recruitments of the remote workers who perform the plurality of works, selecting by the intermediation device, based on the plurality of applications, one or more robots and one or more manipulation terminals as one or more selected robots and one or more selected manipulation terminals. The method includes the step of connecting by the intermediation device, the one or more selected manipulation terminals to the one or more selected robots so that the one or more selected robots are manipulatable by the one or more selected manipulation terminals.

According to this configuration, the manipulation terminal (and the remote worker) can be utilized as an infrastructure for spreading robots, and opportunities for obtaining a reward by operating the manipulation terminal can be given to the remote worker. As a result, the utilization of the remote control robot can be expanded.

Each of the plurality of robots may operate according to an operating command including an individual operating command, and each of the plurality of manipulation terminals may be provided with a manipulation key. The method may include, when the intermediation device receives a manipulation signal corresponding to the manipulation key from the selected manipulation terminal for the selected manipulation terminal and selected robot connected with each other among the one or more selected manipulation terminals and the one or more selected robots, converting the manipulation signal into the individual operating command and sending the individual operating command to the selected robot, by the intermediation device.

According to this configuration, the robot work working system can be caused to function, and, as a result, the utilization of the remote control robot can be expanded.

Effect of the Disclosure

The present disclosure can provide an intermediation device which can expand the utilization of a remote control robot and an intermediating method using the intermediation device.

BRIEF DESCRIPTION OF DRAWINGS

FIG. 8 is a schematic view illustrating one example of a recruiting screen posted to the robot work working system site by the intermediation device.

FIG. 9 is a schematic view illustrating one example of a search screen of recruitment posted to the robot work working system site by the intermediation device.

FIG. 10 is a schematic view illustrating one example of an application screen posted to the robot work working system site by the intermediation device.

FIG. 15 is a schematic view illustrating one example of a recruiting screen posted to the robot work working system site by an intermediation device of Embodiment 2 of the present disclosure.

FIG. 16 is a schematic view illustrating one example of a work screen posted to the robot work working system site by the intermediation device of Embodiment 2 of the present disclosure.

FIG. 20 is a table illustrating types of the key of the game controller in FIG. 17.

FIG. 21 is a table illustrating types of the key of a robot manipulation device.

FIG. 22 is a table illustrating an assignment of an operation key of the game controller to an operating command of the robot in an individual axis mode.

FIG. 23 is a table illustrating an assignment of the operation key of the game controller to the operating command of the robot in case of an independent key operation in a world mode.

FIG. 24 is a table illustrating an assignment of the operation key of the game controller to the operating command of the robot in case of a plural key concurrent operation in the world mode.

FIG. 25 is a table illustrating an assignment of the operation key of the game controller to the operating command of the robot in a tool mode.

MODES FOR CARRYING OUT THE DISCLOSURE

Figure 1:
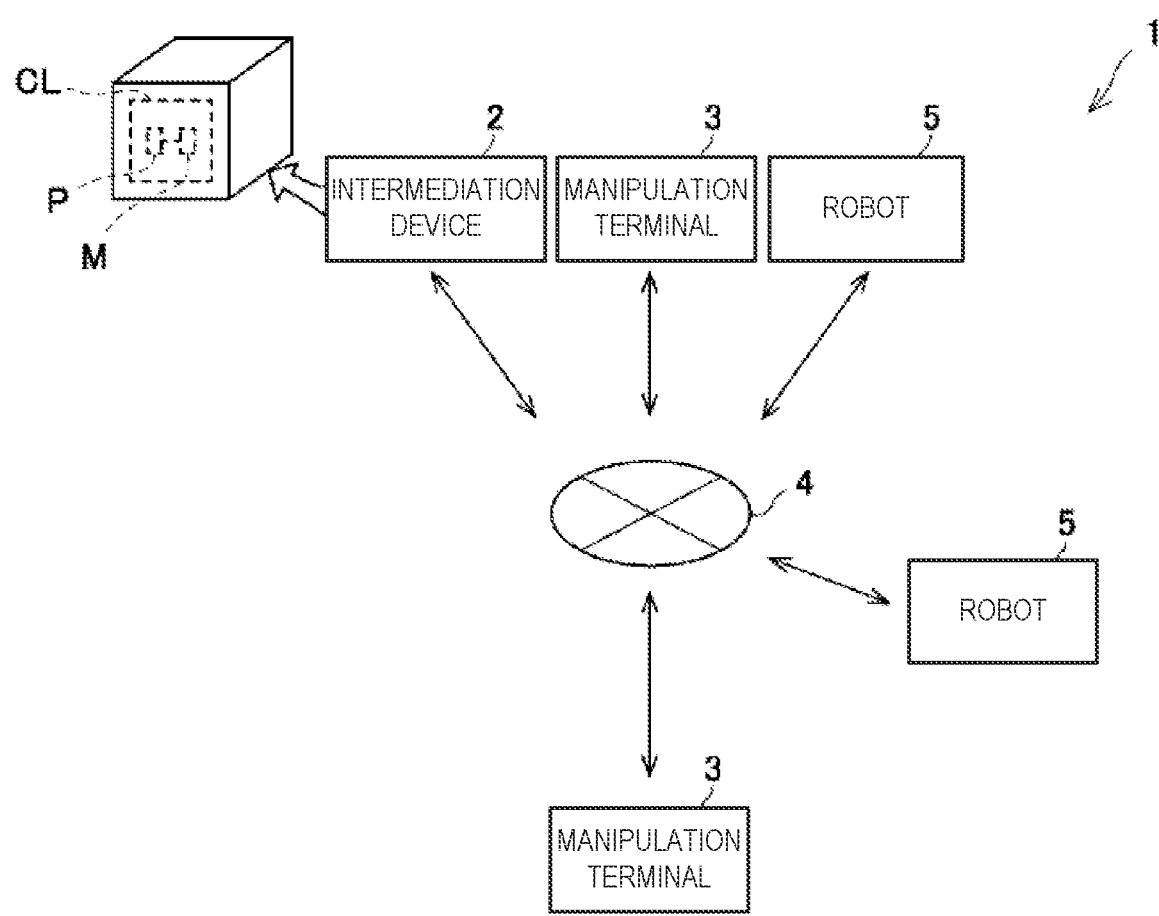
FIG. 1 is a schematic view schematically illustrating one example of a configuration of a robot work working system in which an intermediation device according to Embodiment 1 of the present disclosure is used.

Hereinafter, embodiments of the present disclosure will be described with reference to the drawings. Note that, below, the same reference characters are assigned to the same or corresponding elements throughout the drawings to omit redundant description. Moreover, the present disclosure is not limited to the following embodiments.

Embodiment 1

[Outline of Robot Work Working System]

FIG. 1 is a schematic view schematically illustrating one example of a configuration of a robot work working system 1 in which an intermediation device according to Embodiment 1 of the present disclosure is used.

Referring to FIG. 1, the robot work working system 1 includes an intermediation device 2, a plurality of manipulation terminals 3, and a plurality of robots 5, which are connected with each other through a network 4 where data communication is possible.

Below, an outline of the robot work working system 1 is described.

<Robot Work Working System 1>

The robot work working system 1 is a system for a way of working which makes the specific unemployed contribute to the actual world and enables the specific unemployed to obtain the income while being at home, and is also a robot remote control system which makes it possible to build a social infrastructure for the remote-controlled robots.

<Network 4>

The network 4 may be any network, as long as data communication is possible. The network 4 includes the Internet, LAN (Local Area Network), and WAN (Wide Area Network).

<Intermediation Device 2>

An intermediary retains the intermediation device 2. The intermediary is a coordinator who coordinates a job offer to a worker (hereinafter, referred to as a "remote worker") who performs a work by remote-controlling the robot 5 retained by a robot holder, with a job seeking for a work using the robot 5 by an operator of the manipulation terminal 3.

In detail, the intermediary performs the coordination by establishing a robot work working site on the network 4 by using the intermediation device 2.

The intermediary includes a robot manufacturer, an administrator of an online shop, a personnel dispatching company. The intermediation device 2 is comprised of a server. The phrase "retaining the intermediation device 2" as used herein includes both a form of owning the intermediation device 2 and a form of borrowing the intermediation device 2.

<Robot 5>

The "robot" of the present disclosure (robot 5) is at least either an industrial robot or a service robot, and is not a robot for amusement. This is because one of the purposes of the present disclosure is to make the specific unemployed contribute the society.

The industrial robot includes a vertical articulated robot, a horizontal articulated robot, a parallel-link robot, a rectangular-coordinate robot, and a polar-coordinate robot.

The service robot includes a rescue robot, a cleaning robot, a wall surface working robot, a guard robot, a guidance robot, a wheelchair robot, a sushi robot, a robot for nursing care, a drone robot, and a medical-application robot. Note that the medical-application robot may be excluded from the "robot" of the present disclosure (robot 5). This is because, in order to operate the medical-application robot, qualification(s), technical knowledge, etc. related to medical science may be required.

The robot for amusement includes a robot for games, a toy robot, and a pet robot. The robot for games includes a robot for competition games, a racing car robot for car race games, and a UFO catcher.

Here, the robot 5 is remotely controlled by the manipulation terminal 3 through the intermediation device 2.

<Manipulation Terminal 3>

The manipulation terminal 3 is comprised of an information terminal which is connectable to the network 4. In detail, the manipulation terminal 3 includes a game machine, a game controller, a remote controller dedicated for robots, a personal data assistant (PDA), a smartphone, a personal computer, and a tablet. If the manipulation terminal 3 is an existing manipulation terminal other than the remote controller dedicated for robots, the manipulation terminal 3 can effectively be used as an infrastructure for disseminating robots. On the other hand, if the manipulation terminal 3 is the remote controller dedicated for robots, since the conversion of the manipulation signal is not necessary, the manipulation terminal 3 with high operating efficiency can be provided.

"The form in which the remote worker operates the manipulation terminal 3" includes a form in which the remote worker owns the manipulation terminal 3, a form in which the remote worker borrows the manipulation terminal 3, and a form in which the remote worker operates the manipulation terminal 3 of another person (e.g., a form in which the remote worker operates a game machine at a video arcade).

The "remote worker" is not limited in particular. The remote worker may be a regular person, in addition to the specific unemployed. The remote worker may have a specific qualification (e.g., a care worker, a nurse, etc.) if getting a specific robot work.

[Configuration of Each Element of Robot Work Working System 1]

Below, a configuration of each element which constitutes the robot work working system 1 is described in detail.

<Intermediation Device 2>

Figure 2:
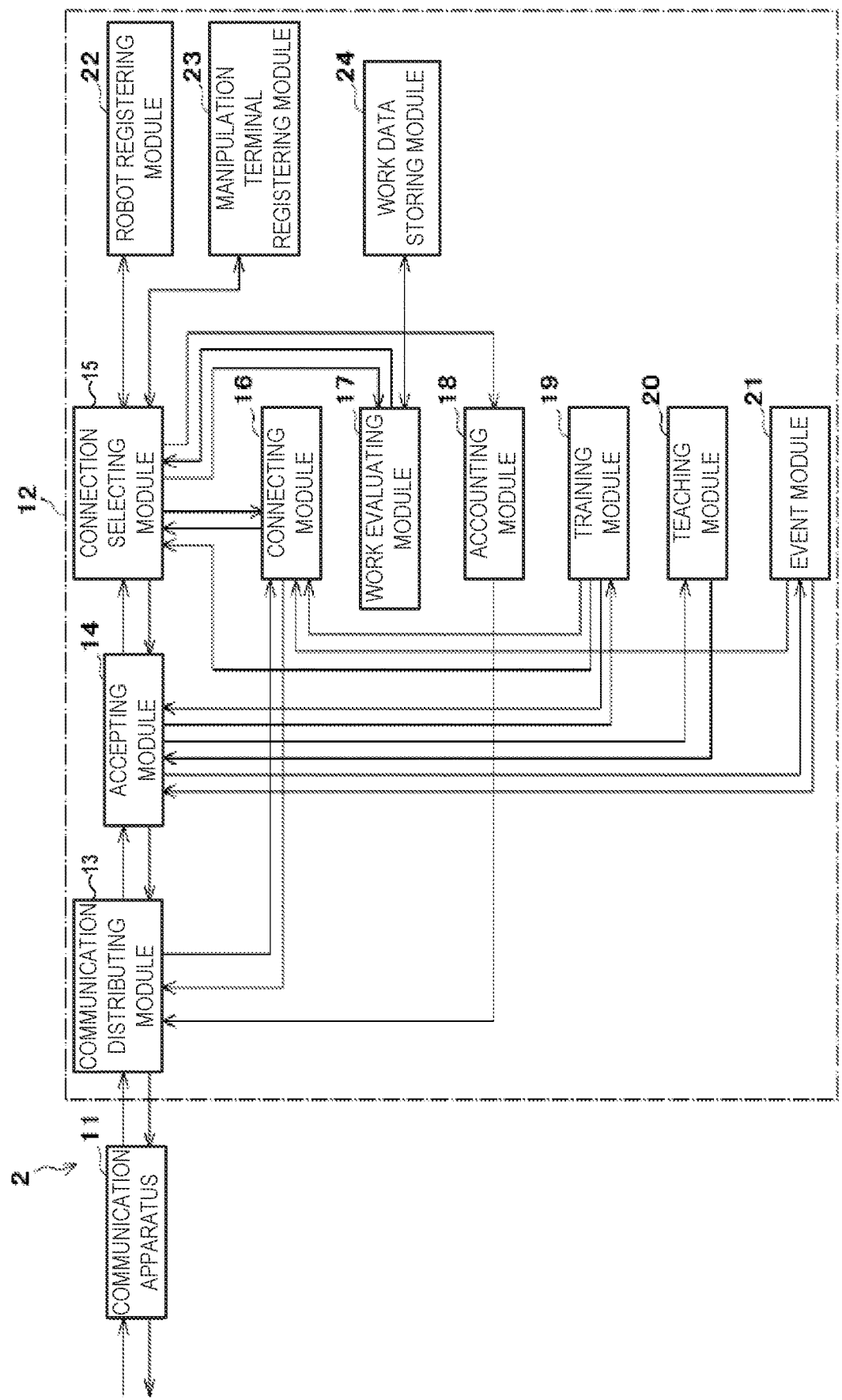
FIG. 2 is a functional block diagram illustrating one example of a configuration of the intermediation device of FIG. 1.

FIG. 2 is a functional block diagram illustrating one example of a configuration of the intermediation device of FIG. 1. In FIG. 2, arrows represent flows of information including data, a signal, an instruction or a command, a notification, etc.

Referring to FIG. 2, the intermediation device 2 is comprised of a server. In detail, the intermediation device 2 includes a communication apparatus 11 and an information processing device 12.

The communication apparatus 11 may be any apparatus as long as data communication is possible.

The information processing device 12 includes a communication distributing module 13, an accepting module 14, a connection selecting module 15, a connecting module 16, a work evaluating module 17, an accounting module 18, a training module 19, a teaching module 20, an event module 21, a robot registering module 22, a manipulation terminal registering module 23, and a work data storing module 24.

Referring to FIGS. 1 and 2, the information processing device 12 is comprised of a computing unit CL having a processor P and a memory M, for example. Each of the communication distributing module 13 to the event module 21 is a functional block implemented by the processor P executing a given program stored in the memory M of the computing unit CL. Moreover, the robot registering module 22, the manipulation terminal registering module 23, and the work data storing module 24 are comprised of the memory M of the computing unit. In detail, the computing unit CL is comprised of, for example, a computer, a personal computer, a microcontroller, an MPU, an FPGA (Field Programmable Gate Array), and a PLC (Programmable Logic Controller). The information processing device 12 may be comprised of a sole computing unit CL which performs a centralized control, or may be comprised of a plurality of the computing units CL which performs a distributed control.

Below, these elements are sequentially described in detail.

{Communication Apparatus 11}

The communication apparatus 11 performs data communication with the manipulation terminal 3 and the robot 5 through the network 4. In detail, the communication apparatus 11 converts information from the communication distributing module 13 into communication data, and transmits the converted communication data to the manipulation terminal 3 or the robot 5. Moreover, the communication apparatus 11 converts communication data from the manipulation terminal 3 or the robot 5 into original information, and sends the converted information to the communication distributing module 13.

{Communication Distributing Module 13}

The communication distributing module 13 sends a variety of information from the accepting module 14, the operating command from the connecting module 16, and an accounting notification from the accounting module 18 to the communication apparatus 11.

The communication distributing module 13 sends the variety of information from the communication apparatus 11 to the accepting module 14, and sends the manipulation signal from the communication apparatus 11 to the connecting module 16.

{Accepting Module 14}

The accepting module 14 performs the following processings.

The accepting module 14 accepts recruitment (see FIG. 8) of the remote worker(s) from the robot 5, sends it to the connection selecting module 15, and notifies the robot 5 about employment or rejection. The accepting module 14 accepts an application (see FIG. 10) for the remote worker from the manipulation terminal 3, sends it to the connection selecting module 15, and notifies a result (whether the person is employed or rejected as the remote worker) to the manipulation terminal 3. Note that, if the person is employed as the remote worker, a notice of acceptance is notified to the robot 5 at the employment end.

The accepting module 14 accepts an application for training from the manipulation terminal 3, and sends it to the training module 19.

The accepting module 14 accepts an application for teaching from the manipulation terminal 3, and sends it to the teaching module 20.

The accepting module 14 accepts an application for an event from the manipulation terminal 3, and sends it to the event module 21.

{Connection Selecting Module 15}

* Selection of Connection *

If a recruitment guideline for the recruitment sent from the accepting module 14 is suitable (there is no defect in the statement of each item), the connection selecting module 15 accepts the recruitment, and sends an acceptance notice to the accepting module 14. The accepting module 14 transmits the acceptance notice to the robot 5 which applied for the recruitment, through the communication distributing module 13 and the communication apparatus 11. Then, the connection selecting module 15 gives a robot ID to the robot 5, and registers (stores) the robot ID and the recruitment guideline in the robot registering module 22 so as to associate the robot ID with the recruitment guideline. Note that, if the robot ID has already been given, this robot ID is used. The robot 5 is identified from transmitting end identification information of the communication data transmitted from the robot 5. The registration of the robot 5 may be erased after the recruited work is finished, or may be maintained for a given period.

Moreover, the connection selecting module 15 compares items in the applications sent from the accepting module 14 with the target recruitment guideline, and determines whether the application satisfies the recruitment guideline. If it does not satisfy the recruitment guideline, the connection selecting module 15 sends a notice of rejection to the accepting module 14. The accepting module 14 transmits the notice of rejection to the manipulation terminal 3 which applied for the recruitment, through the communication distributing module 13 and the communication apparatus 11.

On the other hand, if it satisfies the recruitment guideline, the connection selecting module 15 sends a notice of recruitment to the accepting module 14. The accepting module 14 transmits the notice of recruitment to the manipulation terminal 3 which applied for the recruitment and the robot 5 of the recruiter, through the communication distributing module 13 and the communication apparatus 11. Then, the connection selecting module 15 gives a manipulation terminal ID to the manipulation terminal 3, and registers (stores) the manipulation terminal ID and the application in the manipulation terminal registering module 23 so that the manipulation terminal ID is associated with the application. Note that, if the manipulation terminal ID has already been given, this manipulation terminal ID is used. The manipulation terminal 3 is identified from transmitting end identification information of the communication data transmitted from the manipulation terminal 3. The registration of the manipulation terminal 3 may be erased after the work of the recruitment is finished, or may be maintained for a given period.

The connection selecting module 15 notifies the manipulation terminal 3 and the robot 5 as a selected manipulation terminal and a selected robot to the connecting module 16 together with the manipulation terminal ID and the robot ID. Here, a work mode (a ratio of people (manipulation terminals) and a robot) is also notified.

Note that, below, connecting the selected manipulation terminal 3 to the selected robot 5 may be abbreviated as "connecting the terminal to the robot," and disconnecting the selected manipulation terminal 3 from the selected robot 5 may be abbreviated as "disconnecting the terminal from the robot."

* Accumulation of Work Experiences *

During a work period of the robot 5, the connection selecting module 15 receives from the connecting module 16 sequentially, for each selected manipulation terminal 3, notices of the connection and disconnection of the terminal and the robot corresponding to a start and an end of the work of the day. Then, based on this, the connection selecting module 15 calculates work hours for every day and total work hours of the remote worker of the selected manipulation terminal 3. Moreover, the connection selecting module 15 receives a yield from the work for the day (the number of products, quantity of the work, efforts, etc.) from the connecting module 16. Then, based on this, the connection selecting module 15 calculates the total yield for the work of the remote worker of the selected manipulation terminal 3. Then, the work hours, the yield of the work, and the difficulty of the work are associated with the manipulation terminal ID, and they are stored in the manipulation terminal registering module 23.

The connection selecting module 15 notifies the work hours, the yield of the work, and the difficulty of the work to the work evaluating module 17, and notifies the work hours to the accounting module 18.

The connection selecting module 15 receives, for each manipulation terminal 3, an evaluation of each remote worker from the work evaluating module 17. The connection selecting module 15 stores the evaluation and the manipulation terminal ID in the manipulation terminal registering module 23 so that the evaluation is associated with the manipulation terminal ID, and notifies the evaluation to each manipulation terminal 3 through the accepting module 14, the communication distributing module 13, and the communication apparatus 11. The connection selecting module 15 also uses this evaluation to determine whether the application satisfies the recruitment guideline.

The connection selecting module 15 receives a remote worker's skill based on the result of the training or simulation from the training module 19, and stores the skill in the manipulation terminal registering module 23 so as to be associated with the manipulation terminal ID. Moreover, the connection selecting module 15 also uses the skill to determine whether the application satisfies the recruitment guideline.

{Connecting Module 16}
* Configuration *

Figure 12:
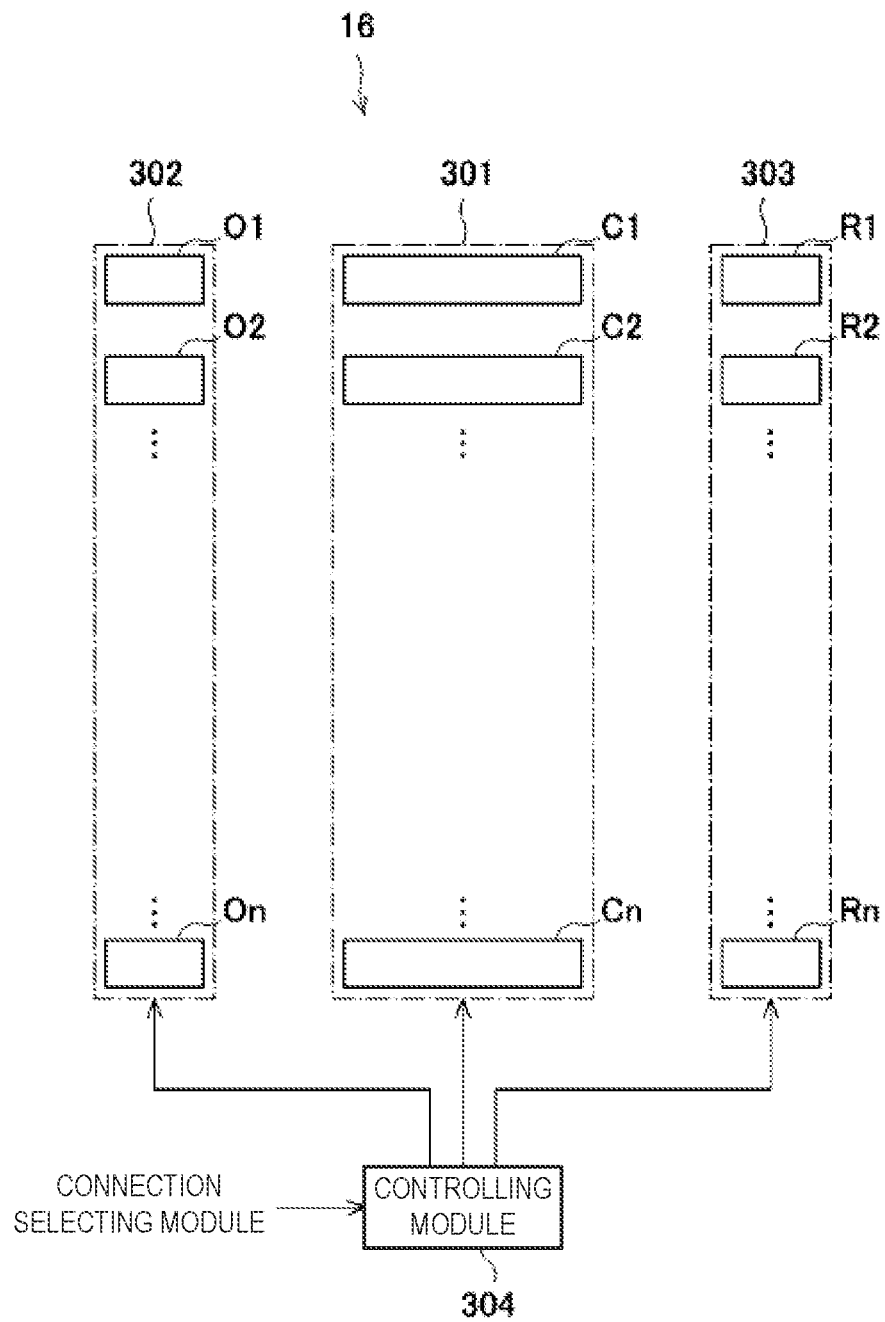
FIG. 12 is a functional block diagram illustrating one example of a configuration of a connecting part of FIG. 2.

FIG. 12 is a functional block diagram illustrating one example of a configuration of the connecting module 16 of FIG. 2. Referring to FIG. 12, the connecting module 16 includes a manipulation signal converting module 301, a terminal-side data communicating module 302, a robot-side data communicating module 303, and a controlling module 304.

The manipulation signal converting module 301 is provided with a given number of individual manipulation signal converting modules C1-Cn. The terminal-side data communicating module 302 is provided with a given number of individual terminal-side data communicating modules O1-On. The robot-side data communicating module 303 is provided with a given number of individual robot-side data communicating modules R1-Rn. Therefore, the connecting module 16 can parallely (simultaneously) connect n selected manipulation terminals 3 and n selected robots 5 at most.

The individual terminal-side data communicating modules O1-On function as communicating modules of data to the manipulation terminals 3 of the individual manipulation signal converting modules C1-Cn. The individual terminal-side data communicating modules O1-On hand over (pass through) data sent from the manipulation terminals 3, through the communication distributing module 13 to the individual manipulation signal converting modules C1-Cn, and send (pass through) data from the individual manipulation signal converting modules C1-Cn to the manipulation terminals 3.

The individual robot-side data communicating modules R1-Rn function as communicating modules of data to the robots 5 of the individual manipulation signal converting modules C1-Cn. The individual robot-side data communicating modules R1-Rn hand over (pass through) data sent by the robot 5, through the communication distributing module 13 to the individual manipulation signal converting modules C1-Cn, and send (pass through) data from the individual manipulation signal converting modules C1-Cn to the robots 5.

The individual manipulation signal converting modules C1-Cn convert the manipulation signals from the individual terminal-side data communicating modules O1-On into the operating commands, and send them to the individual robot-side data communicating modules R1-Rn. The individual robot-side data communicating modules R1-Rn send (pass through) the operating commands to the robots 5. The individual manipulation signal converting modules C1-Cn hand over data other than the manipulation signals. Moreover, even if they are the manipulation signals, the manipulation signals pass through as they are when the manipulation terminals 3 are the remote controllers dedicated for the robots 5. Therefore, work image data (described later) sent out from the robot 5 reach the manipulation terminals 3 via the individual robot-side data communicating modules R1-Rn, the individual manipulation signal converting modules C1-Cn, and the individual terminal-side data communicating modules O1-On.

When the controlling module 304 receives the manipulation terminal ID of the selected manipulation terminal 3, the robot ID of the selected robot 5, and a work mode, it assigns (associates), according to the work mode, the manipulation terminal ID and the robot ID to (with) the individual terminal-side data communicating modules O1-On and the individual robot-side data communicating modules R1-Rn. Therefore, the selected manipulation terminal 3 is connected to the selected robot 5. That is, a state where the selected manipulation terminal 3 and the selected robot 5 are able to perform the data communication through the connecting module 16 (intermediation device 2) is established. On the other hand, when the controlling module 304 cancels the assignment of the manipulation terminal ID and the robot ID to the individual terminal-side data communicating modules O1-On and the individual robot-side data communicating modules R1-Rn, the selected manipulation terminal 3 and the selected robot 5 are disconnected.

Here, one example of a method of performing the work after the manipulation terminal 3 and the robot 5 are registered as the selected manipulation terminal 3 and the selected robot 5 is described. When the manipulation terminal 3 and the robot 5 are registered as the selected manipulation terminal 3 and the selected robot 5, a notice of registration is sent to the selected manipulation terminal 3 and the selected robot 5. Here, URL of a site dedicated for the robot work operation is also notified together. The dedicated site runs on the network 4 by the intermediation device 2, and the connecting module 16 of the intermediation device 2 can be accessed from the dedicated site. The selected manipulation terminal 3 and the selected robot 5 access the dedicated site, and log on and log off therethrough to perform the robot work. When logging on, an authentication using the manipulation terminal ID or the robot ID is performed.

The controlling module 304 receives the following notices from the selected manipulation terminal 3 and the selected robot 5 during the work period of the selected robot 5. At the start of the work, it receives a notice of ready (operation is possible) from the selected robot 5, and receives a notice of work start from the selected manipulation terminal 3. When both the notices are received, the selected manipulation terminal 3 is connected to the selected robot 5. At the end of the work, it receives a notice of work end from the selected robot 5, and receives a notice of work end from the selected manipulation terminal 3. When both the notices are received, the selected manipulation terminal 3 is disconnected from the selected robot 5. Moreover, when a notice of disconnection is received from the manipulation terminal 3, the controlling module 304 transfers it to the robot 5 to disconnect the terminal from the robot. Therefore, the remote controlling person can leave from the work of the robot 5.

The controlling module 304 minutely notifies, for each selected manipulation terminal 3, the connection and the disconnection between the terminal and the robot to the connection selecting module 15. Moreover, the controlling module 304 receives the yield (the number of products, quantity of work, efforts, etc.) of the work for the day from the selected robot 5, and notifies it to the connection selecting module 15.

Moreover, as will be described later, when the controlling module 304 receives a command for connecting the specific manipulation terminal 3 to the robot 5 from the training module 19 and the event module 21, it connects the specific manipulation terminal 3 to the robot 5, and when a command for disconnecting the specific manipulation terminal 3 from the robot 5 is received, it disconnects the specific manipulation terminal 3 from the robot 5.

\* Connection Mode \*

Figures 13, 14:
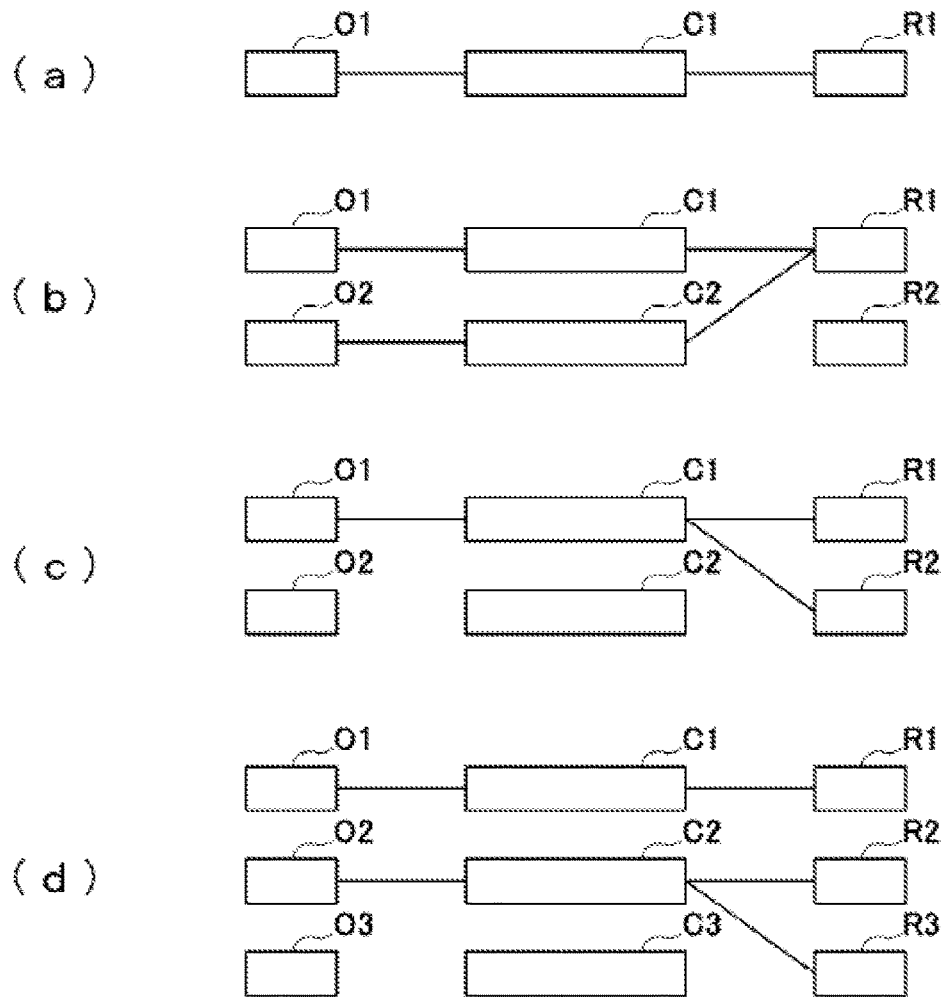
FIG. 13 is a schematic view schematically illustrating one example of a connection mode of the connecting part.
FIG. 14 is a table illustrating actions for liberty of working.

FIG. 13 is a schematic view schematically illustrating one example of a connection mode of the connecting module 16.

Referring to FIG. 13(*a*), when the ratio of the manipulation terminal 3 and the robot 5 is 1:1, one individual terminal-side data communicating module (e.g., O1), one individual manipulation signal converting module (e.g., C1), and one individual robot-side data communicating module (e.g., R1) are associated with each other. In this case, one individual manipulation signal converting module C1 converts the manipulation signal of one manipulation terminal 3 which is received by one individual terminal-side data communicating module O1 into the operating command for one robot 5, and one individual robot-side data communicating module R1 sends out the operating command to the one robot 5.

Referring to FIG. 13(*b*), when the ratio of the manipulation terminal 3 and the robot 5 is 2:1, two individual terminal-side data communicating modules (e.g., O1, O2), two individual manipulation signal converting modules (e.g., C1, C2), and one individual robot-side data communicating module (e.g., R1) are associated with each other. In this case, two individual manipulation signal converting modules C1 and C2 convert the manipulation signal of two manipulation terminals 3, which is received by two individual terminal-side data communicating modules O1 and O2, respectively, into the operating command of one robot 5, and one individual robot-side data communicating module R1 sends out the operating command to the one robot 5. Such a work mode includes a mode in which the robot 5 is a dual-arm robot and two remote workers manipulate left and right arms by using their respective manipulation terminals 3.

Referring to FIG. 13(*c*), when the ratio of the manipulation terminal 3 and the robot 5 is 1:2, one individual terminal-side data communicating module (e.g., O1), one individual manipulation signal converting module (e.g., C1), and two individual robot-side data communicating modules (e.g., R1, R2) are associated with each other. In this case, one individual manipulation signal converting module C1 converts the manipulation signal of one manipulation terminal 3, which is received by one individual terminal-side data communicating module O1 into the operating commands for two robots 5, and two individual robot-side data communicating modules R1 and R2 send out the two operating commands to the two robots 5, respectively. Such a work mode includes a mode in which one remote worker operates two robots 5 by using the manipulation terminal 3 to sequentially carry out two successive processes in a batch work. In this case, the operating commands for the two robots 5 are each assigned to a plurality of manipulation keys (manipulation signals) of the manipulation terminal 3.

Referring to FIG. 13(*d*), when the ratio of the manipulation terminal 3 and the robot 5 is 2:3, two individual terminal-side data communicating modules (e.g., O1, O2), two individual manipulation signal converting modules (e.g., C1, C2), and three individual robot-side data communicating modules (e.g., R1, R2, and R3) are associated with each other. In this case, a first individual manipulation signal converting module C1 converts the manipulation signal of a first manipulation terminal 3 which is received by a first individual terminal-side data communicating module O1 into the operating command for a first robot 5. Moreover, a second individual manipulation signal converting module C2 converts the manipulation signal of a second manipulation terminal 3 which is received by a second individual terminal-side data communicating module O2 into the operating commands of second and third robots 5, and second and third individual robot-side data communicating modules R2 and R3 send out the two operating commands to the second and third robots 5, respectively.

Such a work mode includes, when the first to third robots 5 collaboratively carry out a given work, one of remote workers operates the first robot 5 by using his/her manipulation terminal 3, and the other remote worker operates the second robot 5 and the third robot 5 by using his/her manipulation terminal 3. In this case, the operating commands for the first and second robots 5 are assigned to a plurality of manipulation keys (manipulation signals) of the manipulation terminal 3 of the other remote worker.

It is similar to the above when the number of manipulation terminals 3 is three or more, and when the number of robots 5 is four or more.

\* Conversion of Manipulation Signal \*

Next, a conversion from the manipulation signal of the manipulation terminal 3 to the operating command for the robot 5 is described.

The conversion from the manipulation signal to the operating command can always be performed by the following procedures.

First, the manipulation signal of the manipulation terminal 3 is assigned to the operating command for the robot 5. In other words, the manipulation key of the manipulation terminal 3 is assigned to the operating command for the robot 5. Second, based on the assigned manipulation signal, the operating command corresponding to the manipulation signal is generated. Third, if the number of manipulation signals is short for the number of operating commands, a combination of a plurality of given manipulation signals is assigned to the remaining operating command. In other words, a combination of a plurality of given manipulation keys which are simultaneously pushed is assigned to the remaining operating command.

The connecting module 16 patternizes conversion schemes from the manipulation signal to the operating command and stores these for the manipulation signals (manipulation keys) of a large number of manipulation terminals 3 of well-known model names and the operating commands of a large number of robots 5 of well-known model names. On the other hand, the model name of the selected manipulation terminal 3 is known (see FIG. 10), and the model name of the selected robot 5 is separately notified from the selected robot 5. Therefore, the connecting module 16 can convert the manipulation signal into the operating command by using the conversion scheme from the manipulation signal to the operating command, which is applicable to the model name of the selected manipulation terminal 3 and the model name of the selected robot 5.

{Work Evaluating Module 17}

The work evaluating module 17 receives work hours, a yield of work, and a work difficulty from the connection selecting module 15. For example, the work evaluating module 17 calculates the yield of the work per unit time by dividing the total yield for the work by the total work hours, and then calculates a capability index indicative of a capability (skill) of the remote worker of the corresponding manipulation terminal 3 by multiplying the calculated yield of the work per unit time by a coefficient indicative of the difficulty of the work.

The work evaluating module 17 evaluates this capability index as an absolute capability of each remote worker.

Moreover, the work evaluating module 17 calculates a ranking of the capability index of each remote worker among the capability indexes of all the remote workers, and evaluates this ranking as a relative capability of each remote worker.

For example, the work evaluating module 17 ranks each remote worker for the absolute capability and the relative capability, and gives a status on the work according to the rank. For example, as the status, a skill level and a qualification are given according to the rank. Here, levels of A-E are given to those with higher ranks of the absolutely capability as the skill level, and qualifications of first to fifth grades are given to those with higher ranks of the relative capability as the qualification. Moreover, a title such as master, a position (post), etc. may be given as the status. Alternatively, the work evaluating module 17 may define a reward of the remote worker (payment by hour, bonus, etc.) according to the rank. The treatment of the remote worker is defined based on the agreement with the holder (owner) of the robot 5.

The work evaluating module 17 stores the evaluation in the work data storing module 24 so as to be associated with the manipulation terminal ID, and notifies it to the connection selecting module 15.

According to this work evaluation, the remote worker can be made more competitive.

{Accounting Module 18}

The accounting module 18 calculates a pay amount to the remote worker of the manipulation terminal 3 based on the work hours received from the connection selecting module 15, and notifies it to the manipulation terminal 3 through the communication distributing module 13 and the communication apparatus 11. Then, the accounting module 18 pays the remote worker the reward by a given payment method. The given payment method includes a money transfer to a specified bank account and a payment using a specified credit company.

{Training Module 19}

When the training module 19 receives an application for training from the accepting module 14, it gives a training to the remote worker of the manipulation terminal 3. The training includes a training using the robot 5 and a training using a game. For example, in the training using the robot 5, a manipulation method of the robot 5 and a method of performing the work by the robot 5 are trained.

Alternatively, the training module 19 may provide a simulation of the robot 5 to the remote worker, instead of the training. The simulation includes a simulation using the robot 5 and a simulation using a game. For example, in the simulation using the robot 5, the manipulation method of the robot 5 and the method of performing the work by the robot 5 are imitated.

When using the robot 5 for the training or the simulation, the training module 19 notifies the connecting module 16 so that the manipulation terminal 3 which applied for it is connected to the robot 5 to be used or disconnected from the robot 5 used, according to a start and an end of the training or the simulation. Thus, the manipulation terminal 3 is connected to the robot 5 and the training or the simulation is performed, and when the training or the simulation ends, the manipulation terminal 3 is disconnected from the robot 5.

The training module 19 evaluates the capability (skill) of the remote worker based on the result of the training or the simulation, and gives the skill level (evaluation on the absolute scale) and the qualification (evaluation on the relative scale) described above, according to the evaluation. The training module 19 notifies the evaluation (including the skill level and the qualification) to the connection selecting module 15, and notifies it to the manipulation terminal 3 through the communication distributing module 13 and the communication apparatus 11.

According to the training or the simulation, the skill of the remote control worker who is employed for the work of the robot 5 can be maintained at a certain level or higher. Moreover, those who have not worked using the robot work working system 1 may acquire the skill level and the qualification required for the work to be able to use the robot work working system 1.

{Teaching Module 20}

The teaching module 20 gives a training for acquiring the qualification described above to a remote worker of the manipulation terminal 3 who applied for the training. In detail, the teaching module 20 explains about the system for acquiring the qualification (e.g., the qualification is given according to the work experience, the qualification can be acquired through the training or the simulation, etc.), the basic knowledge about the robot 5, the basic knowledge about the work, etc.

According to this training, the remote worker is given an opportunity to acquire the "skill level" and the "qualification," and an opportunity to improve his/her capability.

{Event Module 21}

The event module 21 holds an event where the remote controlling persons can gather and the robots 5 can be spread into the society. For example, the event module 21 holds a game using the industrial robots 5. In this game, for example, participants compete how fast or how well they can carry out an actual work (painting, assembling, picking, etc.). Then, an image of this game is distributed to the world through the Internet.

In this case, the event module 21 notifies to the connecting module 16 so as to connect or disconnect the manipulation terminal 3 which applied, to or from the robot 5 to be used according to a start and an end of the game. Thus, the manipulation terminal 3 is connected to the robot 5 and the game is commenced, and when the game is finished, the manipulation terminal 3 is disconnected from the robot 5.

By this event, the system 1 in which the robot 5 is remote-controlled by the manipulation terminal 3 can be made widely recognized in the society, and, as a result, the utilization of the robot 5 can be expanded.

<Manipulation Terminal 3>

Figure 3:
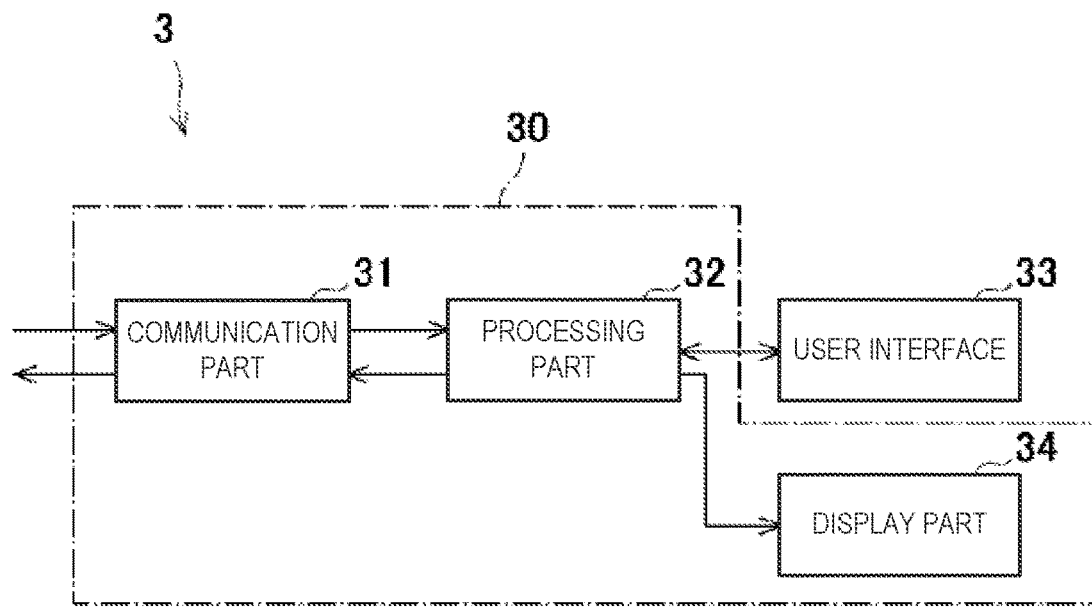
FIG. 3 is a functional block diagram illustrating one example of a configuration of a manipulation terminal of FIG. 1.

FIG. 3 is a functional block diagram illustrating a configuration example of the manipulation terminal 3 of FIG. 1. Referring to FIG. 3, the manipulation terminal 3 includes a main body 30 and a user interface 33. The main body 30 includes a communication part 31, a processing part 32, and a display part 34. The communication part 31 carries out data communications with the intermediation device 2 through the network 4. In detail, the communication part 31 converts information from the processing part 32 into communication data, and transmits the converted communication data to the intermediation device 2. Moreover, the communication part 31 converts the communication data from the intermediation device 2 into the original information, and sends the converted information to the processing part 32. Here, the processing part 32 sends a manipulation signal generated by operating a manipulation key of the user interface 33, to the intermediation device 2 through the communication part 31. Moreover, the processing part 32 displays on the display part 34 a work image of the robot 5 which is received from the intermediation device 2 through the communication part 31. Moreover, the processing part 32 performs various kinds of communications with the intermediation device 2 according to a suitable operation of the manipulation key of the user interface 33.

When a plurality of manipulation keys are operated, the user interface 33 generates the manipulation signal according to the operation. Here, a case where the manipulation terminal 3 is a game machine is described.

Figure 4:
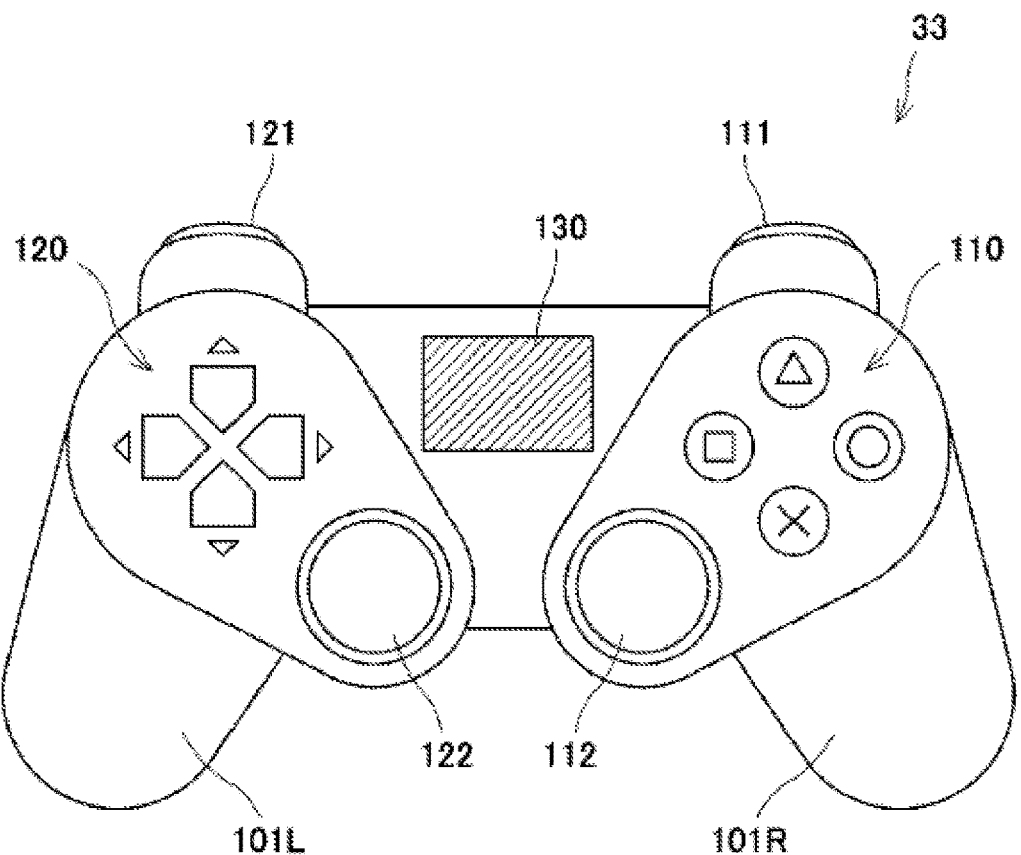
FIG. 4 is an outline view illustrating one example of a configuration of a game controller of a game machine, as the manipulation terminal.

FIG. 4 is an outline view illustrating one example of a configuration of a game controller 33 of the game machine as the manipulation terminal 3.

Referring to FIG. 4, the game controller 33 has a substantially inverted U-shape. The remote worker holds handles 101L and 101R at both wings parts with both left and right hands and operates the game controller 33. An operation key group 110, a cross key 120, and analog stick keys 112 and 122 are provided in left and right upper surfaces of the game controller 33, and an R1 key 111 is provided in a right front surface of the game controller 33, and an L1 key 121 is provided in a left front surface. The operation key group 110 and the analog stick key 112 are operated with the remote worker's right-hand thumb, and the cross key 120 and the analog stick key 122 are operated with the remote worker's left-hand thumb. Moreover, the R1 key 111 and the L 1 key 121 are operated with the remote worker's right-hand index finger and left-hand index finger, respectively. The game controller 33 is further provided with a touchpad 130 between the operation key group 110 and the cross key 120.

In this embodiment, for example, the manipulation signal (manipulation key) is assigned to the operating command for the robot 5 by the connecting module 16 of the intermediation device 2 as follows.

Figure 5:
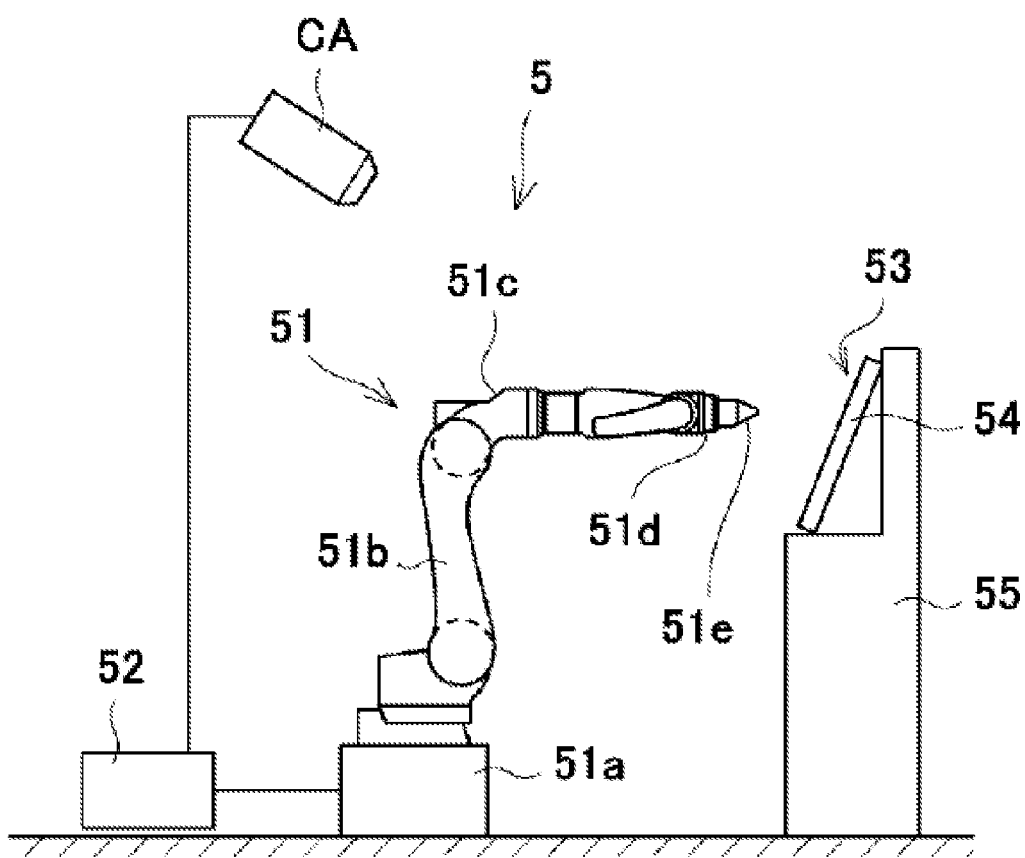
FIG. 5 is a schematic view schematically illustrating one example of a configuration of the robot of FIG. 1.

Referring to FIGS. 4 and 5, here, for example, the manipulation signal of the cross key 120 and the manipulation signal of the analog stick key 122 are assigned to a position command of the robot 5. Further, the operation key group 110 is assigned to various operating commands of the end effector 51e of the robot 5. Moreover, the manipulation signals of the R1 key 111 and the L1 key 121 are assigned to commands for causing the robot 5 to perform a plurality of operations.

Therefore, the remote worker can manipulate the robot 5 by using the game controller 33. According to the game controller 33, when the remote worker is a gamer, since he/she is used to handling it, he/she can demonstrate the advanced skills and manipulate the robot 5 well.

<Robot 5>

FIG. 5 is a schematic view schematically illustrating one example of a configuration of the robot 5 of FIG. 1. Referring to FIG. 5, the robot 5 includes a robot body 51, a robot controller 52, and a camera CA as an imaging device.

The robot body 51 is, for example, a vertical articulated robot, and includes a pedestal 51a, a lower arm 51b, an upper arm 51c, a wrist 51d, and an end effector 51e attached to a tip end of the wrist 51d. Here, the end effector 51e is a painting gun.

Here, the work of the robot 5 is painting a work object 53. The work object is a panel 54 placed on a support table 55. The robot 5 is manipulated by the remote worker to discharge paint and paint the panel 54 while moving the painting gun 51e. The camera CA images a situation of the work performed by the robot 5, and sends the captured work image to the robot controller 52.

Figures 6, 7:
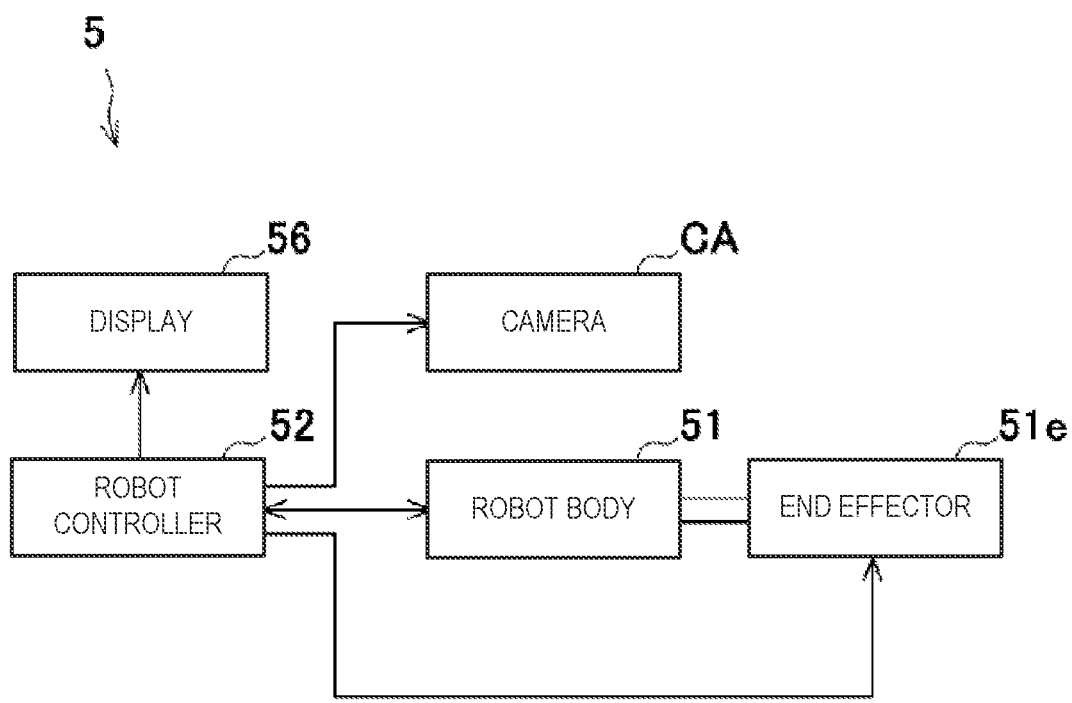
FIG. 6 is a functional block diagram illustrating one example of a configuration of a control system of the robot.
FIG. 7 is a schematic view illustrating one example of a menu screen posted to a robot work working system site by the intermediation device.

FIG. 6 is a functional block diagram illustrating one example of a configuration of the control system of the robot 5. Referring to FIG. 6, the robot controller 52 controls operation of the robot body 51 and the end effector 51e according to the operating command sent from the intermediation device 2. Moreover, it sends the work image from the camera CA to the intermediation device 2. Moreover, the robot controller 52 carries out data communication with the intermediation device 2 through the network 4, and displays the content of the communication on a display 56, if needed. In the data communication with the intermediation device 2, a given operator operates an input device (not illustrated), if needed, to perform necessary processing (e.g., recruiting processing etc.).

In the present disclosure, the robot controller 52 carrying out the data communication is expressed as "the robot 5 carrying out the data communication."

[Operation of Robot Work Working System 1]

Next, operation of the robot work working system 1 configured as described above is described in order.

<Recruiting>

FIG. 7 is a schematic view illustrating one example of a menu screen posted to the robot work working system site by the intermediation device 2. FIG. 8 is a schematic view illustrating one example of a recruiting screen posted to the robot work working system site by the intermediation device 2.

Referring to FIG. 7, the accepting module 14 of the intermediation device 2 displays the menu screen illustrated in FIG. 7 on the accessing end, if accessed from the outside. Here, when the robot 5 accesses, this menu screen is displayed on the display 56 of the robot 5. When a given operator of the robot 5 clicks "RECRUITING (or hiring)," the recruiting screen illustrated in FIG. 8 is displayed on the display 56.

In FIG. 8, items 1-13 constitute a recruitment guideline, and "CURRENT COMPETITIVE RATIO OR NUMBER OF WAITING PERSON(S)" is an item which is displayed when a recruitment is searched after the recruitment is accepted.

The given operator of the robot 5 enters the name of a holder (or owner) of the robot 5 in the entry column of "RECRUITER," enters the type of the robot 5 in the entry column of "ROBOT TYPE," enters a ratio of the number of operators (the number of manipulation terminals) and the number of robots into the entry column of "WORK MODE," enters a starting date and an ending date of the work in the entry column of "WORK PERIOD," enters a start time and an end time of the work in the entry column of "WORKING HOURS," enters whether a leave from the work by a notice is accepted in the entry column of "FREE LEAVE ACCEPTANCE," enters a pay amount per work in the entry column of "REWARD," enters a skill level needed for the work in the entry column of "SKILL LEVEL," enters a qualification required for the work in the entry column of "QUALIFICATION," enters the number of persons according to the number of works and the work mode in the entry column of "NUMBER OF PERSON(S) TO BE HIRED," enters a method of hiring the remote worker in the entry column of "HIRING METHOD," and enters a difficulty of the work in the entry column of "WORK DIFFICULTY."

Here, "articulated robot" or "parallel-link robot" is entered into "ROBOT TYPE." The "starting date of work" may be "immediate start." For example, "order of applications," "fit selection," "auction," etc. are entered into "HIRING METHOD." For example, "normal," "difficult," "easy," etc. are entered into "WORK DIFFICULTY." The difficulty may be expressed by other classifications. Moreover, if it is difficult to express the work difficulty appropriately, this may be omitted.

When the given operator finishes the entry and clicks a confirmation button (not illustrated), the application is examined by the connection selecting module 15 of the intermediation device 2.

If the application fails, a decision result of "rejected" is displayed. In this case, the given operator retries the application or gives up the job.

If the application is satisfactory, the application is accepted and the acceptance is displayed. Moreover, the robot ID is displayed and the recruiting procedure of the robot 5 is finished. On the other hand, the intermediation device 2 registers the recruitment guideline in the robot registering module 22 so as to be associated with the robot ID.

<Application and Connection Between Terminal and Robot>

FIG. 9 is a schematic view illustrating one example of a search screen for the recruitment posted to the robot work working system site by the intermediation device. FIG. 10 is a schematic view illustrating one example of an application screen posted to the robot work working system site by the intermediation device.

Referring to FIG. 7, when the manipulation terminal 3 accesses, this menu screen is displayed on the display part 34 of the manipulation terminal 3. When the remote worker clicks "APPLICATION," the search screen illustrated in FIG. 9 is displayed on the display part 34. This search screen corresponds to each of the items of the recruitment guideline. The remote worker inputs a desired content for each item. When the remote worker wants to search about a matter other than the items of the recruitment guideline, he/she can search by key word(s). When the remote worker decides all the search items and clicks a "SEARCH" key, a list of recruitments which matches with the search item(s) (not illustrated) is displayed. The remote worker suitably views each recruitment in the list. In this case, as illustrated in FIG. 8, "CURRENT COMPETITIVE RATIO OR NUMBER OF WAITING PERSON(S)" is displayed in the recruitment guideline displayed while being viewed. The "CURRENT COMPETITIVE RATIO" is a ratio of the number of applicants to the number of person(s) to be hired before the work for the recruitment is started, and the "CURRENT NUMBER OF WAITING PERSON(S)" is the number of person(s) who waits for working when the work for the recruitment has been commenced. The remote worker refers to these indications. It is easier to be hired as the "COMPETITIVE RATIO" or the "NUMBER OF WAITING PERSON(S)" is less, but the job may be unpopular.

The remote worker clicks the "APPLYING" key (not illustrated) when he/she decided to apply for the recruitment. Then, the application screen illustrated in FIG. 10 is displayed on the display part 34. The remote worker enters each item of the application.

Here, for example, the remote worker enters his/her own name in the entry column of "APPLICANT," enters "ARTICULATED ROBOT" in the entry column of "ROBOT TYPE," enters "COMPONENT ASSEMBLY" in the entry column of "CONTENT OF WORK," enters "OPERATOR 1: ROBOT 1" in the entry column of "WORK MODE," enters "IMMEDIATE START" in the entry column of "WORK PERIOD," enters "START 14:00, END 16:00" in the entry column of "WORK HOURS," enters "ACCEPTABLE" in the entry column of "FREE LEAVE ACCEPTANCE," enters "1,000 JPY" in the entry column of "REWARD," enters "A" in the entry column of "SKILL LEVEL," enters "FIRST GRADE" in the entry column of "QUALIFICATION," enters "100 PERSONS" in the entry column of "NUMBER OF PERSON(S) TO BE HIRED," enters "ORDER OF APPLICATION" in the entry column of "HIRING METHOD," enters "NORMAL" in the entry column of "WORK DIFFICULTY," enters the model name of his/her manipulation terminal in the entry column of "TYPE OF MANIPULATION DEVICE," and enters "NUMBER OF WAITING PERSON(S): 1 PERSON" in the entry column of "ALLOWABLE COMPETITIVE RATIO OR NUMBER OF WAITING PERSON(S)."

When the remote worker finishes the entry and clicks a confirmation button (not illustrated), the connection selecting module 15 of the intermediation device 2 operates as follows.

Figure 11:
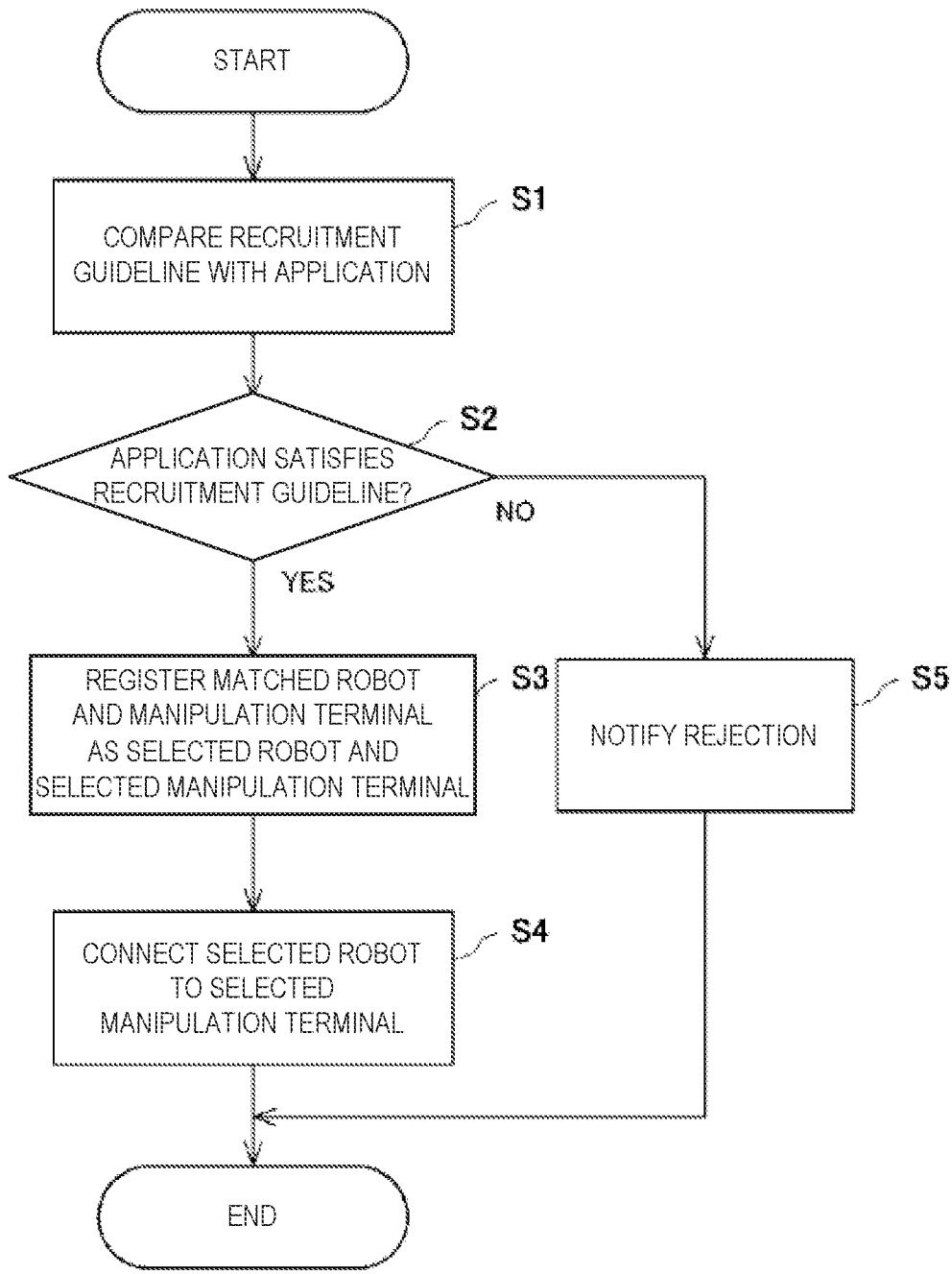
FIG. 11 is a flowchart illustrating one example of operation of a connection selecting module of FIG. 2.

FIG. 11 is a flowchart illustrating one example of operation of the connection selecting module 15 of FIG. 2.

Referring to FIG. 11, the connection selecting module 15 compares the recruitment guideline with the application (Step S1).

Next, the connection selecting module 15 determines whether the application satisfies the recruitment guideline (Step S2). Here, one example of the determination is described. Of course, other determination methods may be applied.

The recruitment guideline (not illustrated) which is a target of the application illustrated in FIG. 10 describes, for example, "ARTICULATED ROBOT" in the entry column of "ROBOT TYPE," "COMPONENT ASSEMBLY" or "PAINTING" in the entry column of "CONTENT OF WORK," "OPERATOR 1: ROBOT 1" in the entry column of "WORK MODE," "IMMEDIATE START" in the entry column of "WORK PERIOD," "START 8:00, END 17:00" in the entry column of "WORK HOURS," "ACCEPTABLE" in the entry column of "FREE LEAVE ACCEPTANCE," "1,000 JPY" in the entry column of "REWARD," "≥B" in the entry column of "SKILL LEVEL," "≥SECOND GRADE" in the entry column of "QUALIFICATION," "1,000 PERSONS" in the entry column of "NUMBER OF PERSON(S) TO BE HIRED," "ORDER OF APPLICATION" in the entry column of "HIRING METHOD," and "EASY" in the entry column of "WORK DIFFICULTY."

Moreover, when the connection selecting module 15 determines the "skill level" and the "qualification," it compares the "skill level" and the "qualification" which are described in the application with the "skill level" and the "qualification" which are given to the applicant by the work evaluating module 17 or the training module 19, and if there is difference(s) between both, it determines whether the applicant satisfies the required "skill level" and "qualification" based on the latter "skill level" and "qualification." This is to keep any trouble from occurring in the work (job). Here, for example, the "skill level" and the "qualification" which are described in the application match with the "skill level" and the "qualification" which are given to the applicant by the training module 19.

Therefore, in this case, the work conditions described in the application satisfy the hiring conditions described in the recruitment guideline. Then, the connection selecting module 15 determines that the application matches with the recruitment guideline.

Note that, here, when the match-up of the work hours of the application to the work hours of the recruitment guideline is determined, the match-up is determined when the work hours of the application are within a range of the work hours of the recruitment guideline. However, these criteria are one example and other criteria may also be used. For example, the match-up may be determined only when the work hours of the application are in agreement with the work hours of the recruitment guideline, or may be determined only when the work hours of the application are longer than the work hours of the recruitment guideline (permitting working outside given hours).

Note that, if it does not match up, a decision result of "rejection" is notified to the accepting module 14 (Step S5), and "rejection" is displayed on the display part 34 by the accepting module 14. In this case, the remote worker retries the application or gives up the job.

As described above, if it matches up, the remote worker is accepted (is given the job) and the acceptance is displayed on the display part 34. Moreover, the manipulation terminal ID is displayed and the application procedure of the manipulation terminal 3 is finished. On the other hand, the connection selecting module 15 registers the manipulation terminal 3 in the manipulation terminal registering module 23 as the selected manipulation terminal so that the application is associated with the manipulation terminal D. Moreover, it registers the robot 5 in the robot registering module 22 as the selected robot 5 (Step S3).

Here, although the connection selecting module 15 connects the selected manipulation terminal 3 to the selected robot 5 when the start time of the work of the recruitment comes, since the start time of the work is here "immediate start," it connects the selected manipulation terminal 3 to the selected robot 5 by the processing method described above (Step S4).

The remote worker operates the key(s) of the game controller 33 while watching the work image which is sent from the robot 5 and displayed on the display part 34. Then, the manipulation signal of the key operation is converted into the operating command by the connecting module 16 of the intermediation device 2, and the robot controller 52 controls the operation of the robot 5 according to the operating command.

Therefore, the remote worker can use the manipulation terminal 3 to perform work by manipulating the robot 5.

When the end time of the work for the day of the remote worker comes, the connecting module 16 disconnects the selected manipulation terminal 3 from the robot as described above.

Note that, at the start time of the work for the day of the remote worker, the connecting module 16 connects the selected manipulation terminal 3 to the robot by a notice from the robot 5 and the manipulation terminal 3, as described above.

Henceforth, such a connection and disconnection of the terminal and the robot is repeated.

Moreover, since the free leave from the work is permitted, the remote worker notifies the intermediation device 2 that he/she leaves the work when he/she wants to leave from the work. Then, the connecting module 16 disconnects the manipulation terminal 3 from the robot.

<Work Evaluation and Payoff>

As described above, the work by the remote worker is evaluated by the work evaluating module 17, and the reward which is the price or value of the work is paid by the accounting module 18.

<Training etc.>

When the remote worker accesses the robot work working site by using the manipulation terminal 3, the menu screen illustrated in FIG. 7 is displayed on the display part 34 as described above. When the remote worker clicks "TRAINING," he/she can receive the training or the simulation by the training module 19 as described above.

Moreover, when the remote worker clicks "TEACHING," he/she can receive the teaching by the teaching module 20 as described above.

Moreover, when the remote worker clicks "EVENT," he/she can participate in an event hosted by the event module 21 as described above.

<Authentication>

When the robot 5 applies for the hiring, and the manipulation terminal 3 applies for the application, training, teaching, or event, the authentication is not required as described above. However, for the procedure for which they have finished the application, when they accesses the robot work working site for performing the subsequent procedures, a given authentication using a password, an ID, etc. is performed.

<Liberty of Working>

One of the features of the robot work working system 1 of Embodiment 1 is the liberty of working. FIG. 14 is a table illustrating actions for the liberty of working.

Referring to FIG. 14, as the actions of the liberty of working, first, the work hours can be specified as illustrated in FIGS. 8 and 10, when the holder of the robot 5 approves it. Therefore, those who want to work can work whenever they want to work.

Second, as described above, by the manipulation terminal 3 sending the notice of leave to the intermediation device 2, the operator of the robot 5 (remote worker) can leave from the work. Therefore, they do not need to work when they cannot work.

Third, when the holder of the robot 5 wishes, the recruitment is continued until the ending date of the work period of the robot 5 comes.

Fourth, the excess and deficiency of the number of applicants to the number of person(s) to be hired are displayed on the recruiting screen (FIG. 8).

According to the third and fourth actions, the negative side, such as the work being stopped or interrupted can be compensated by permitting the liberty of working.

In fact, there are many works among those performed by the robot 5, which do not cause much trouble even if they are stopped. For example, it may be a simple batch work, such as subassembly.

In addition, if the robot work working system 1 is recognized widely and the number of recruitments and the number of applications increase remarkably, it becomes possible to fully secure the necessary number of remote workers for the work even when the liberty of working is permitted. Therefore, it becomes possible to carry out the work, without being stopped.

Moreover, since the work is possible by operating the manipulation terminal 3, those who want to work can work in their life territories.

[Effects]

As being apparent from the above description, according to Embodiment 1, the utilization of the remote control robot 5 can be expanded. Moreover, the specific unemployed can be made to contribute to the actual world. In addition, the specific unemployed can get the income while being at home.

Embodiment 2

FIG. 15 is a schematic view illustrating one example of a recruiting screen posted to a robot work working system site by an intermediation device of Embodiment 2 of the present disclosure. FIG. 16 is a schematic view illustrating one example of a work screen posted to the robot work working system site by the intermediation device of Embodiment 2 of the present disclosure.

Embodiment 2 differs from Embodiment 1 in the application method by the manipulation terminal 3, and other configurations are the same as Embodiment 1.

In Embodiment 2, the recruitment guideline is the same as the recruitment guideline of Embodiment 1. However, "CURRENT COMPETITIVE RATIO OR NUMBER OF WAITING PERSON(S)" is not displayed on the recruiting screen.

For the manipulation terminal 3 to apply for a recruitment, the manipulation terminal 3 sends job application illustrated in FIG. 16 to the intermediation device 2. Items in the job application are the same as those in the application (see FIG. 10) of Embodiment 1. However, the item "ALLOWABLE COMPETITIVE RATIO OR NUMBER OF WAITING PERSON(S)" does not exist.

In the intermediation device 2, the connection selecting module 15 compares the recruitment guideline accepted at this point in time with the job application accepted at this point in time, and selects the robot 5 and the manipulation terminal 3 corresponding to the recruitment guideline and the job application which satisfy the items of each other, as the selected robot and the selected manipulation terminal.

Other processings are the same as Embodiment 1.

According to such Embodiment 2, the utilization of the remote control robot 5 can be expanded similar to Embodiment 1. Moreover, the specific unemployed can be made to contribute to the actual world. In addition, the specific unemployed can get the income while being at home.

Embodiment 3

The embodiment 3 of the present disclosure is an embodiment illustrating the detail of the conversion from the manipulation signal of the manipulation terminal 3 to the operating command for the robot 5 in Embodiment 1. Therefore, the entire configuration of the robot work working system 1 in Embodiment 3 is the same as the configuration of the robot work working system 1 in Embodiment 1.

Below, a case where the manipulation terminal 3 is the game machine is described.

Figure 17:
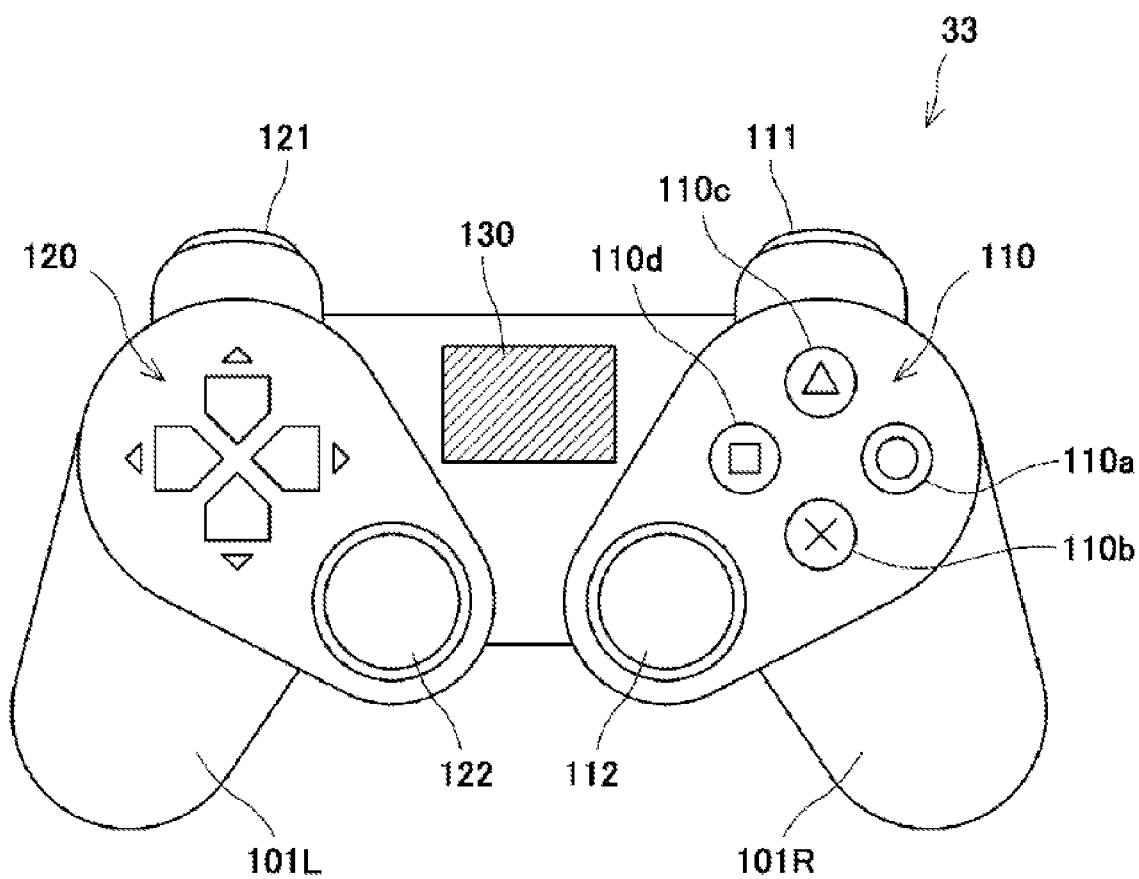
FIG. 17 is an outline view illustrating one example of a configuration of a game controller of a game machine as a manipulation terminal in Embodiment 3 of the present disclosure.

FIG. 17 is an outline view illustrating one example of a configuration of a game controller 33 of the game machine as the manipulation terminal 3 in Embodiment 3. The game controller 33 in FIG. 17 is the same as the game controller 33 in FIG. 3. A reference characters are given to each of the operation keys of the controller 33, and therefore, it is possible to describe them.

Referring to FIG. 17, an operation key group 110, a cross key 120, a right joystick 112, and a left joystick 122 are provided in left and right upper surfaces of the game controller 33. A right command key 111 is provided in a right front surface of the game controller 33, and a left command key 121 is provided in a left front surface. The operation key group 110 is comprised of a first multipurpose key 110a, a second multipurpose key 110b, a third multipurpose key 110c, and a fourth multipurpose key 110d.

The operation key group 110 and the right joystick 112 are operated with the operator's right-hand thumb, and the cross key 120 and the left joystick 122 are operated with the operator's left-hand thumb. Moreover, the right command key 111 and the left command key 121 are operated with the operator's right-hand index finger and left-hand index finger, respectively. The game controller 33 is further provided with a touchpad 130 between the operation key group 110 and the cross key 120.

<Robot 5>

Figure 18:
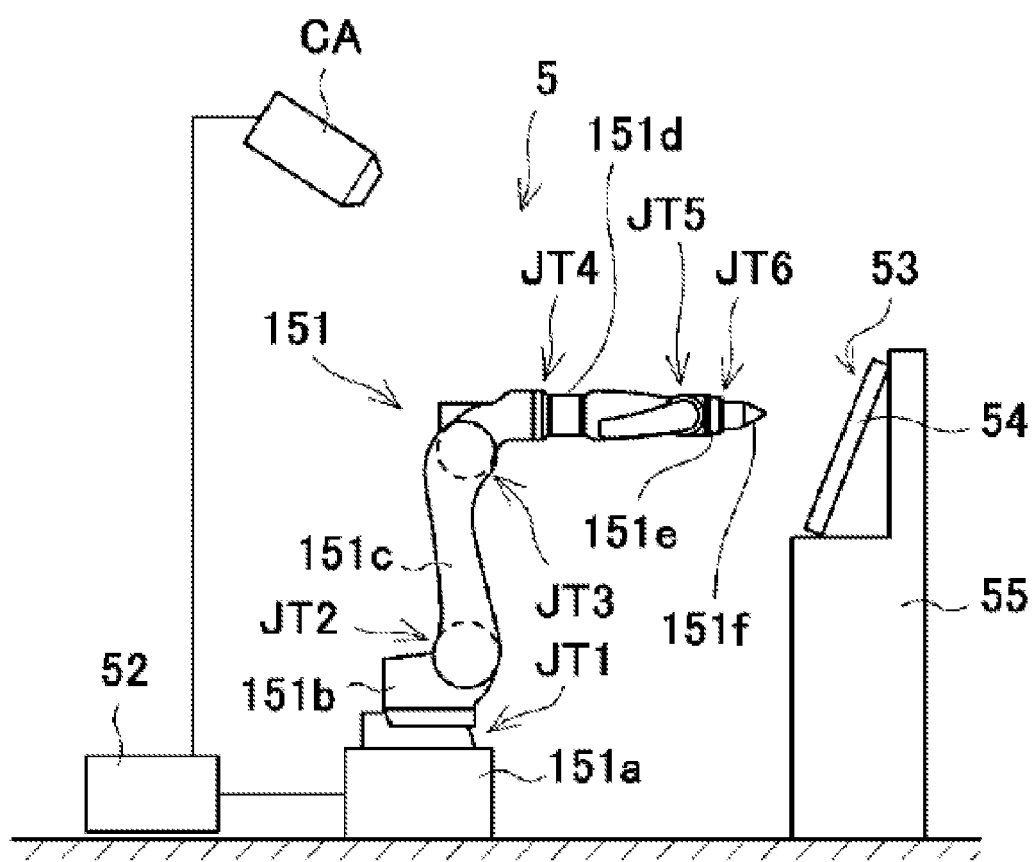
FIG. 18 is a schematic view schematically illustrating one example of a configuration of the robot in Embodiment 3 of the present disclosure.

FIG. 18 is a schematic view schematically illustrating one example of the configuration of the robot 5 in Embodiment 3. The robot 5 of FIG. 18 is the same as the robot 5 of FIG. 5. In FIG. 18, reference characters are given to the detailed parts of the robot body 151, and therefore, it is possible to describe about the robot body 151 in more detail.

Referring to FIG. 18, the robot 5 includes a robot body 151, a robot controller 52, and a camera CA as an imaging device.

The robot body 151 is, for example, a vertical articulated robot, and includes a pedestal 151a, a rotary body 151b, a lower arm 151c, an upper arm 151d, a wrist 151e, and an end effector 151f which is attached to a tip end of the wrist 151e. Here, the end effector 151f is a painting gun.

Here, the work of the robot 5 is painting of a work object 53. The work object 53 is a panel 54 placed on a support table 55. The robot 5 is operated by the remote worker to discharge paint and paint the panel 54 while moving the painting gun 151f. The camera CA images a situation of the work by the robot 5, and sends the captured work image to the robot controller 52.

Figure 19:
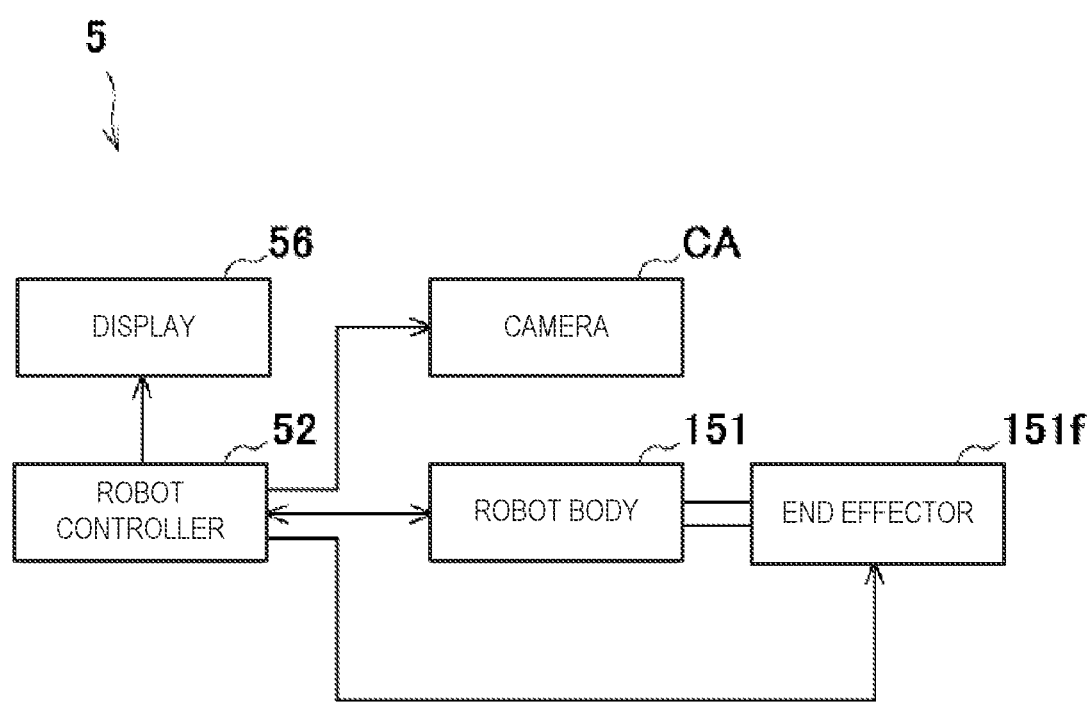
FIG. 19 is a functional block diagram illustrating one example of a configuration a control system of the robot in Embodiment 3 of the present disclosure.

FIG. 19 is a functional block diagram illustrating one example of a configuration of a control system of the robot 5 in Embodiment 3. Referring to FIG. 19, the robot controller 52 controls operation of the robot body 151 and the end effector 151f according to the operating commands (individual operating commands) sent from the intermediation device 2. Moreover, it sends the work image from the camera CA to the intermediation device 2. Moreover, the robot controller 52 carries out data communication with the intermediation device 2 through the network 4, and displays the content of the communication on the display 56 as needed. In the data communication with the intermediation device 2, a given operator operates an input device (not illustrated), if needed, to perform necessary processing (e.g., recruiting processing etc.).

In the present disclosure, "the robot controller 52 carrying out the data communication" is expressed as "the robot 5 carrying out the data communication."

In the intermediation device 2, the communication apparatus 11 performs data communication with the manipulation terminal 3 and the robot 5 through the network 4. In detail, the communication apparatus 11 converts information from the communication distributing module 13 into communication data, and transmits the converted communication data to the manipulation terminal 3 or the robot 5. Moreover, the communication apparatus 11 converts the communication data from the manipulation terminal 3 or the robot 5 into the original information, and sends the converted information to the communication distributing module 13.

The communication distributing module 13 performs a distribution of the manipulation signal from the communication apparatus 11 to the connecting module 16, and a sending out of the operating command from the connecting module 16 to the communication apparatus 11.

In the connecting module 16, as described in Embodiment 1, although the manipulation signal converting module 301, the terminal-side data communicating module 302, the robot-side data communicating module 303, and the controlling module 304 play the respective roles for performing the necessary operations to perform the conversion from the manipulation signal to the operating command, it is described below that the connecting module 16 performs all the operations of the conversion from the manipulation signal to the operating command, in order to facilitate understandings of the description. Further, below, the "selected manipulation terminal" is referred to as the "manipulation terminal," and the "selected robot" is referred to as the "robot," for simplifying the description.

As described in Embodiment 1, when the connecting module 16 receives the manipulation signal from the manipulation terminal 3 through the communication apparatus 11 and the communication distributing module 13, it converts the manipulation signal into the operating command, and sends it to the robot 5 through the communication distributing module 13 and the communication apparatus 11. Note that the connecting module 16 does not perform the conversion, when the manipulation signal is not necessary to be converted (e.g., the manipulation signal in case of the user interface of the manipulation terminal 3 being the manipulation device dedicated for the robot 5). Moreover, the work image from the robot 5 passes through the manipulation signal converting module 16, and goes toward the manipulation terminal 3.

{Conversion of Manipulate Signal}

Next, the conversion from the manipulation signal of the manipulation terminal 3 into the operating command for the robot 5 is described. As described in Embodiment 1, the conversion from the manipulation signal to the operating command can always be performed by the following procedures.

First, the manipulation signal of the manipulation terminal 3 is assigned to the operating command for the robot 5. In other words, the manipulation key of the manipulation terminal 3 is assigned to the operating command for the robot 5. Second, based on the assigned manipulation signal, the operating command corresponding to the manipulation signal is generated. Third, if the number of manipulation signals is short for the number of operating commands, a combination of a plurality of given manipulation signals is assigned to the remaining operating command. In other words, a combination of a plurality of given manipulation keys which are simultaneously pushed is assigned to the remaining operating command.

The connecting module 16 patternizes a conversion scheme from the manipulation signal to the operating command for the manipulation signals (manipulation keys) of a large number of manipulation terminals 3 of well-known model names and the operating commands of a large number of robots 5 of well-known model names, and stores the pattern. Meanwhile, a model name of the manipulation terminal 3 is separately notified from the manipulation terminal, and a model name of the robot 5 is separately notified from the robot 5. Therefore, the connecting module 16 can convert the manipulation signal into the operating command by using the conversion scheme from the manipulation signal to the operating command, which is applicable to the model name of the manipulation terminal 3 and the model name of the robot 5.

{Manipulation Key Assignment}

Next, a manipulation key assignment is described. The manipulation key assignment indicates how a plurality of manipulation keys of the manipulation terminal 3 is associated with one or more individual operating commands of the robot 5, and how one or more manipulation signals corresponding to the plurality of manipulation keys are converted into the one or more individual operating commands. Below, a case where the manipulation terminal 3 is a game machine provided with the game controller 33 of FIG. 17 is described.

* Operation Key of Game Controller 33 *

FIG. 20 is a table illustrating types of the key of the game controller 33. Referring to FIGS. 17 and 20, the plurality of operation keys of the game controller 33 have the following functions in major games.

The cross key 120 moves the manipulation target in two axial directions. The left joystick 122 moves the manipulation target in a two-dimensional direction. The right joystick 112 moves a viewpoint of a game space. The first multipurpose key 110a approves setting. The second multipurpose key 110b cancels the setting. The third multipurpose key 110c attacks the target. The fourth multipurpose key 110d attacks the target. The left command key 121 achieves a plurality of given operations by a single operation. The right command key 111 achieves a plurality of given operations by a single operation.

* Manipulation Key of Robot Manipulation Device *

First, joints of the robot 5 are described. Referring to FIG. 18, the robot body 151 has a first axis JT1 which is a joint for swiveling the rotary body 151b with respect to the pedestal 151a, a second axis JT2 which is a joint for rotating the lower arm 151c with respect to the rotary body 151b, a third axis JT3 which is a joint for bending the upper arm 151d with respect to the lower arm 151c, a fourth axis JT4 which is a joint for twisting the upper arm 151d, a fifth axis JT5 which is a joint for bending the wrist 151e with respect to the upper arm 151d, and a sixth axis JT6 which is a joint for rotating (twisting) the end effector 151f with respect to the wrist 151e.

Next, the manipulation key of the robot manipulation device is described. This robot manipulation device is assumed to be a manipulation device which generates the manipulation signal used as the foundation of the operating command for the robot 5. The robot 5 may or may not be provided with this robot manipulation device. If the robot 5 has the robot manipulation device, the robot controller 52 switches between the manipulation signal from the robot manipulation device and the operating command from the intermediation device 2, and uses it for the motion control for the robot 5.

FIG. 21 is a table illustrating types of the key of the robot manipulation device. Referring to FIGS. 18 and 21, the robot manipulation device includes first to sixth axis keys, a robot control mode switch key, a tool control mode switch key, a tool on-off key, and a tool manipulation key.

These manipulation keys have the following functions.

The first axis key moves the first axis JT1 of the robot in an individual axis mode. A first axis operating command is generated based on the manipulation signal of the first axis key.

The second axis key moves the second axis JT2 of the robot in the individual axis mode. A second axis operating command is generated based on the manipulation signal of the second axis key.

The third axis key moves the third axis JT3 of the robot in the individual axis mode. A third axis operating command is generated based on the manipulation signal of the third axis key.

The fourth axis key moves the fourth axis JT4 of the robot in the individual axis mode. A fourth axis operating command is generated based on the manipulation signal of the fourth axis key.

The fifth axis key moves the fifth axis JT5 of the robot in the individual axis mode. A fifth axis operating command is generated based on the manipulation signal of the fifth axis key.

The sixth axis key moves the sixth axis JT6 of the robot in the individual axis mode. A sixth axis operating command is generated based on the manipulation signal of the sixth axis key.

The robot control mode switch key switches the control mode of the robot between the individual axis mode, a world mode, and a tool mode. A robot control mode switch command is generated based on the manipulation signal of the robot control mode switch key.

The tool control mode switch key switches the control mode of a tool (here, the end effector 151*f*). A tool control mode switch command is generated based on the manipulation signal of the tool control mode switch key.

The tool on-off key turns on/off the tool. A tool on-off command is generated based on the manipulation signal of the tool on-off key. The tool manipulation key operates the tool. A tool operating command is generated based on the manipulation signal of the tool manipulation key.

\* Manipulation Key Assignment \*

Next, a manipulation key assignment is described.

FIG. 22 is a table illustrating an assignment of the operation key of the game controller 33 to the operating command for the robot 5 in the individual axis mode. In the individual axis mode, the entire body 151 of the robot 5 can be operated finely by operating each of the axes JT1-JT6 of the body 151 of the robot 5.

Referring to FIGS. 17 and 22, the cross key 120 is assigned to the first axis operating command and the second axis operating command. In this case, the first axis operating command corresponds to an operation of the cross key 120 in the left-and-right direction, and the second axis operating command corresponds to an operation of the cross key 120 in the front-and-rear direction.

The left joystick 122 is assigned to the third axis operating command and the fourth axis operating command. In this case, the third axis operating command corresponds to an operation of the left joystick 122 in the left-and-right direction, and the fourth axis operating command corresponds to an operation of the left joystick 122 in the front-and-rear direction.

The right joystick 112 is assigned to the fifth axis operating command and the sixth axis operating command. In this case, the fifth axis operating command corresponds to an operation of the right joystick 112 in the left-and-right direction, and the sixth axis operating command corresponds to an operation of the right joystick 112 in the front-and-rear direction.

The first multipurpose key 110*a* is assigned to the robot control mode switch command.

The second multipurpose key 110*b* is assigned to the tool control mode switch command.

The third multipurpose key 110*c* is assigned to the tool on-off command, and the fourth multipurpose key 110*d* is assigned to the tool operating command.

The left command key 121 and the right command key 111 are not assigned to any command.

FIG. 23 is a table illustrating an assignment of the operation key of the game controller 33 to the operating command of the robot 5 in case of the independent key operation in the world mode. In the world mode, by commanding the position of the wrist 151*e*, the robot body 151 can be operated so that the wrist 151*e* is located at the commanded position.

Referring to FIGS. 17 and 23, the cross key 120 is assigned to an X-axis position command and a Y-axis position command. In this case, the X-axis position command corresponds to an operation of the cross key 120 in the left-and-right direction, and the Y-axis position command corresponds to an operation of the cross key 120 in the front-and-rear direction.

The left joystick 122 is assigned to an X-axis rotation command and a Y-axis rotation command. In this case, the X-axis rotation command corresponds to an operation of the left joystick 122 in the left-and-right direction, and the Y-axis rotation command corresponds to an operation of the left joystick 122 in the front-and-rear direction.

The right joystick 112 is assigned to a Z-axis rotation command. In this case, the Z-axis rotation command corresponds to an operation of the right joystick 112 in the front-and-rear direction.

The left command key 121 and the right command key 111 are assigned to a Z-axis positive position command and a Z-axis negative position command, respectively. Other manipulation key assignments are the same as those in the individual axis mode.

FIG. 24 is a table illustrating an assignment of the operation key of the game controller 33 to the operating command of the robot 5 in case of a plural key concurrent operation in the world mode.

Referring to FIGS. 17 and 24, the first multipurpose key 110*a* and the second multipurpose key 110*b* are assigned to a first command. The first command automatically moves the tool in the X-axis direction by a first operation, and then stops the tool by a second operation.

The third multipurpose key 110*c* and the fourth multipurpose key 110*d* are assigned to a second command. The second command automatically moves the tool in the Y-axis direction by a first operation, and then stops the tool by a second operation.

The left command key 121 and the right command key 111 are assigned to a third command. The third command automatically moves the tool in the Z-axis direction by a first operation, and then stops the tool by a second operation.

The cross key 120, the left joystick 122, and the right joystick 112 are not assigned to any command.

According to the manipulation key assignment, by simultaneously pushing a plurality of manipulation keys set by the assignment (pushing twice), the first to third commands move the tool along the X-axis, the Y-axis, or the Z-axis by any distance.

FIG. 25 is a table illustrating an assignment of the operation key of the game controller 33 to the operating command for the robot 5 in the tool mode.

Referring to FIGS. 17 and 25, the cross key 120 is assigned to an O-axis position command and an A-axis position command. In this case, the O-axis position command corresponds to an operation of the cross key 120 in the left-and-right direction, and the A-axis position command corresponds to an operation of the cross key 120 in the front-and-rear direction.

The left joystick 122 is assigned to a T-axis position command. In this case, the T-axis position command corresponds to an operation of the left joystick 122 in the front-and-rear direction.

The O-axis position command, the T-axis position command, and the A-axis position command are individual operating commands which instruct or command the posture of the tool. Therefore, in the tool mode, the tool can be operated correctly by operating only the tool (here, the end effector 1510.

The right joystick 112, the left command key 121, and the right command key 111 are not assigned to any command. Other manipulation key assignments are the same as those in the individual axis mode.

Thus, by performing the manipulation key assignment, the remote worker can freely manipulate the body 151 and the end effector 151*f* of the robot 5 by operating the manipulation key of the game controller 33.

Here, the following points are particularly important.

Since the individual operating commands for instructing the operation of each of the axes JT1-JT6 of the robot 5 and the position of the wrist 151*e*, and the posture of the tool (end effector 151*f*) correspond to the manipulation signals of the cross key 120, the left joystick 122, and the right joystick 112 which move the manipulation target in a desired direction similar to the user interface (game controller) 33 of the manipulation terminal 3, the operator (remote worker) of the manipulation terminal 3 can manipulate the robot 5, without feeling uncomfortable so much.

Since the first multipurpose key 110*a* and the second multipurpose key 110*b* are assigned to the single first command, the third multipurpose key 110*c* and the fourth multipurpose key 110*d* are assigned to the single second command, and the left command key 121 and the right command key 111 are assigned to the single third command, the conversion of the manipulation signal to the operating command can be performed even if the number of manipulation keys of the manipulation terminal is short for the number of operating commands.

Since the first to third commands are generated, the robot 5 can perform a plurality of operations. Here, for example, the painting gun 151*f* can be moved in the X-axis direction by a desired distance and can be stopped, by simultaneously pushing the manipulation keys of the first multipurpose key 110*a* and the second multipurpose key 110*b* twice. Note that, alternatively, for example, if the end effector 151*f* is a gripper, the first command may be a command for causing the robot 5 to position a workpiece with a fitting protrusion above a workpiece with a fitting hole, then lower the workpiece with the fitting protrusion, and fit the fitting protrusion into the fitting hole.

Since the first multipurpose key 110*a* is assigned to the robot control mode switch command, the control mode of the robot 5 can be switched by operating the manipulation key of the manipulation terminal 3.

Since the second multipurpose key 110*b* is assigned to the tool control mode switch command, the control mode of the tool (end effector 151*f*) can be switched by operating the manipulation key of the manipulation terminal 3.

Note that, for example, the manipulation signal which is generated by operating one manipulation key of the manipulation terminal 3 by a given mode (e.g., pushing a plurality of times, a combination of a long push and a short push, etc.) may be converted into the individual operating command of the robot 5. Thereby, even if the number of manipulation keys of the manipulation terminal 3 is short for the number of individual operating commands, the manipulation signal can be converted into the individual operating command.

Moreover, the first to third commands may be a "pick and place" command for causing the robot 5 to lift the workpiece and place it at a given location, and a command for causing the robot 5 to move a painting gun to a given location and discharge paint from the painting gun. In this case, a given place or a given location may be instructed with the position command for the robot 5, and a necessary operation of the gripper or the painting gun may be instructed with an end effector operating command.

[Operation]

Figure 26:
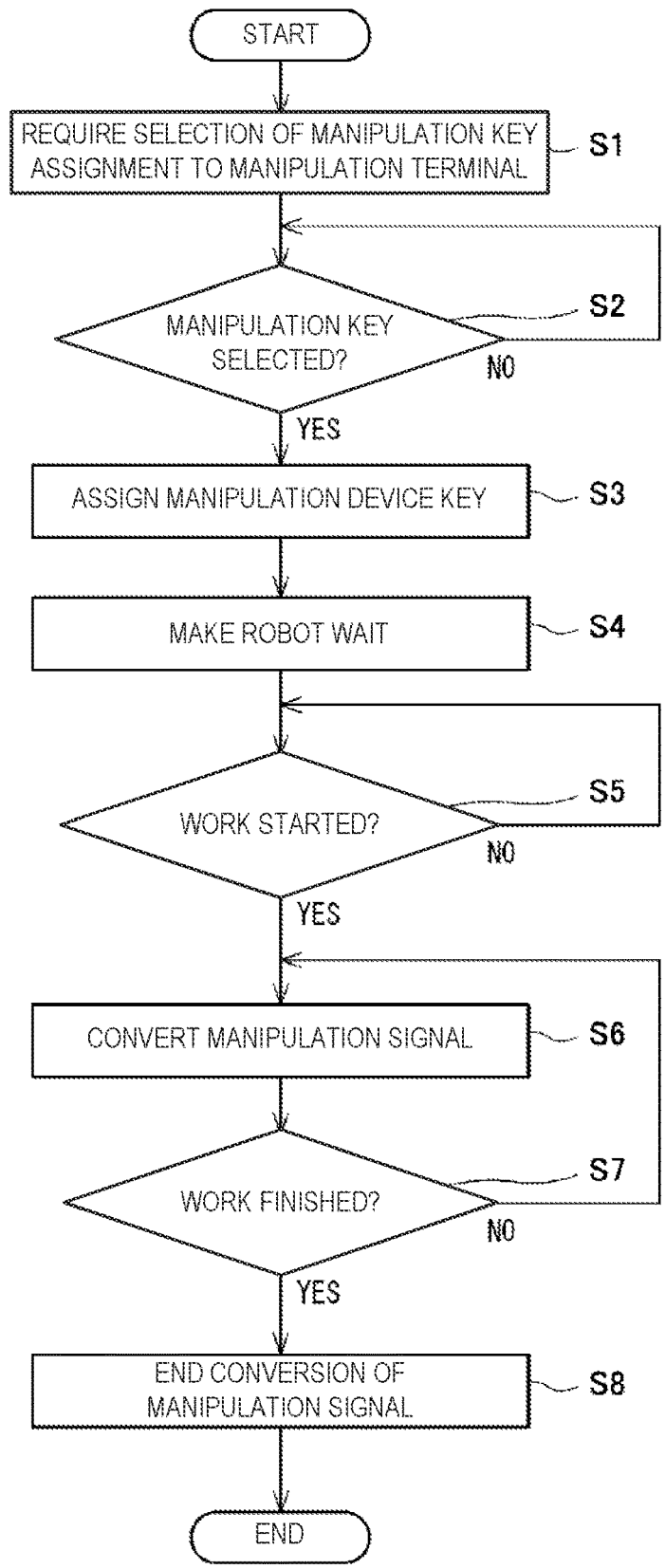
FIG. 26 is a flowchart illustrating operation of the intermediation device.

Next, operation of the intermediation device 2 configured as described above is described. FIG. 26 is a flowchart illustrating the operation of the intermediation device 2.

Referring to FIG. 26, the connecting module 16 of the intermediation device 2 first requests a selection (decision) of the manipulation key assignment to the manipulation terminal 3 (Step S1). In this case, the connecting module 16, for example, presents the manipulation key assignments illustrated in FIGS. 22 to 25 which are created in advance, and makes the manipulation terminal 3 decide only correction(s). In this way, the individual operating command to be converted from the manipulation signal can be changed so that the operator (remote worker) of the manipulation terminal 3 can operate the manipulation key easily.

Next, the connecting module 16 waits for the manipulation key being selected (NO at Step S2). If the manipulation key is selected (YES at Step S2), the manipulation signal is converted to the individual operating command according to the manipulation key assignment selected by the manipulation terminal 3 which assigns the manipulation device key (assigning the manipulation key) (Step S3).

Next, the robot 5 waits for a work (Step S4).

Next, the connecting module 16 waits for a start of the work (NO at Step S5). Then, if the work is started (YES at Step S5), the manipulation signal of the manipulation terminal 3 is converted into the individual operating command, and it is sent to the robot 5 (Step S6).

Next, if the work is finished (YES at Step S7), the connecting module 16 ends the conversion of the manipulation signal into the individual operating command (Step S8).

Note that the connecting module 16 may be configured so that, when a manipulation key change notice is received from the manipulation terminal 3 outside of work hours, the connecting module 16 changes one or more individual operating commands to be converted from one or more manipulation signals according to the manipulation key change notice.

According to Embodiment 1 described above, when the connecting module 16 receives one or more manipulation signals corresponding to a plurality of manipulation keys of the manipulation terminal 3, since it converts the one or more manipulation signals into the one or more individual operating commands in the operating command for the robot 5, and sends the one or more individual operating commands to the robot 5, the robot 5 can be manipulated through the network 4 and the intermediation device 2 by operating the manipulation key of the manipulation terminal 3. Therefore, the robot work working system 1 can be caused to function, and, as a result, the utilization of the remote control robot 5 can be expanded.

Other Embodiment

In Embodiment 3, instead of Embodiment 1, Embodiment 2 may be modified as described above.

It is apparent for the person skilled in the art that many improvements and other embodiments are possible from the above description. Therefore, the above description is to be interpreted only as illustration.

INDUSTRIAL APPLICABILITY

The intermediation device of the present disclosure and the intermediating method using the same are useful as the intermediation device and the intermediating method using the same which can expand the utilization of the remote control robot.

DESCRIPTION OF REFERENCE CHARACTERS

1 Robot Work Working System
2 Intermediation Device
3 Manipulation Terminal
4 Network
5 Robot
11 Communication Apparatus
12 Information Processing Device
13 Communication Distributing Module
14 Accepting Module
15 Connection Selecting Module
16 Connecting Module
17 Work Evaluating Module
18 Accounting Module
19 Training Module
20 Teaching Module
21 Event Module
22 Robot Registering Module
23 Manipulation Terminal Registering Module
30 Main Body
31 Communication Part
32 Processing Part
33 User Interface
34 Display Part
51 Robot Body
52 Robot Controller
56 Display
110 Operation Key Group
111 Right Command Key
112 Right Joystick
120 Cross Key
121 Left Command Key
122 Left Joystick
151 Robot Body
301 Manipulation signal converting module
302 Terminal-side Data Communicating Module
303 Robot-side Data Communicating Module
CA Camera
CL Computing Unit
M Memory
P Processor
JT1-JT6 First to Sixth Axes

The invention claimed is:

1. An intermediation device held by an intermediary and connected to a plurality of manipulation terminals operated by a plurality of remote workers and a plurality of robots held by one or more robot holders through a network in which data communication is possible, the intermediation device comprising:
a processor configured to:
receive, from the plurality of robots, recruitments of the remote workers who operate the plurality of robots and perform a plurality of works, each of the recruitments including information indicating a robot type and information indicating a content of work,
post the recruitments of the remote workers who perform the plurality of works on a site on the network of the intermediary who holds the intermediation device, and
when the processor receives applications for the recruitments, through the site, from the plurality of manipulation terminals, the processor is configured to select, based on the plurality of applications in comparison to the information included in the recruitments, one or more robots and one or more manipulation terminals as one or more selected robots and one or more selected manipulation terminals, and connects the one or more selected manipulation terminals to the one or more selected robots so that the one or more selected robots are manipulatable by the one or more selected manipulation terminals, each of the applications including information indicating a robot type, information indicating a content of work and information indicating a type of manipulation terminal,
wherein
each of the plurality of robots operates according to an operating command including an individual operating command,
each of the plurality of manipulation terminals is provided with a manipulation key,
when a manipulation signal corresponding to the manipulation key is received from the selected manipulation terminal for the selected manipulation terminal and the selected robot connected with each other among the one or more selected manipulation terminals and the one or more selected robots, the processor is configured to convert the manipulation signal into the individual operating command and sends the individual operating command to the selected robot,
the plurality of manipulation keys include a move key configured to move a manipulation target and a function key used for multiple purposes,
the operating command includes, as the individual operating command, a position command for instructing a position of a wrist part of each of the robots, and an end effector operating command for controlling operation of an end effector attached to the wrist part of each of the robots, and
the processor is configured to convert the manipulation signal corresponding to the move key into the position command and converts the manipulation signal corresponding to the function key into the end effector operating command.

2. The intermediation device of claim 1, wherein the processor is configured to connect, according to a mode of the plurality of works, the one or more selected manipulation terminals to the one or more selected robots in a relation in which a ratio of the one or more selected manipulation terminals and the one or more selected robots is at least one of 1:1, n:1 (n is a natural number of two or larger), 1:m (m is a natural number of two or larger), and n:m.

3. The intermediation device of claim 1, wherein the processor is configured to determine for one of the recruitments, according to items of the recruitment for the remote workers who perform the plurality of works, the one or more selected manipulation terminals and the one or more selected robots, in an order of receiving the applications, or by a selection from the plurality of applications.

4. The intermediation device of claim 1, wherein the processor is configured to connect the one or more selected manipulation terminals to the one or more selected robots, immediately or at a time in the future, according to a work period presented in the recruitment corresponding to each of the selected robots.

5. The intermediation device of claim 1, wherein the processor is configured to disconnect the one or more selected manipulation terminals from the one or more selected robots according to respective notices from the one or more selected manipulation terminals.

6. The intermediation device of claim 1, wherein items of the recruitments for the remote workers who perform the plurality of works include information related to a content of each of the plurality of works, a level of skill required for each of the plurality of works, and a reward for each of the plurality of works.

7. The intermediation device of claim 1, wherein the plurality of manipulation terminals are at least any of a game machine, a game controller, a remote controller dedicated for the robot, a personal digital assistant, a smartphone, a personal computer, and a tablet.

8. The intermediation device of claim 1, wherein the processor is configured to manage a system related to qualifications required for the plurality of works or a ranking system in which the remote workers who perform the plurality of works are ranked.

9. The intermediation device of claim 8, wherein
the processor is configured to manage a training meeting for acquiring the qualification.

10. The intermediation device of claim 1, wherein
the processor is configured to give a training or a simulation for a manipulation of the robot.

11. The intermediation device of claim 1, wherein
the processor is configured to manage an event where the plurality of remote workers gather.

12. The intermediation device of claim 1, wherein
the processor is configured to send a notice of rejection for display on a manipulation terminal that is not selected.

13. The intermediation device of claim 1, wherein
the operating command includes one or more individual operating commands,
wherein each of the manipulation terminals is provided with a plurality of manipulation keys, and
wherein, when one or more manipulation signals corresponding to the plurality of manipulation keys are received, the processor is configured to convert the one or more manipulation signals into one or more individual operating commands and sends the one or more individual operating commands to the selected robot.

14. The intermediation device of claim 13, wherein, when the processor receives a manipulation key change notice from the selected manipulation terminal, the processor is configured to change, according to the manipulation key change notice, the one or more individual operating commands to be changed from the one or more manipulation signals.

15. The intermediation device of claim 13, wherein, when the number of the plurality of manipulation keys of the selected manipulation terminal is short for the number of the one or more individual operating commands, the processor is configured to convert each of the manipulation signals corresponding to operation in a given mode of one or more manipulation keys among the plurality of manipulation keys into the one or more individual operating commands.

16. The intermediation device of claim 13, wherein
the processor is configured to convert at least any of the one or more manipulation signals into one or more individual operating commands for causing the selected robot to perform a plurality of operations.

17. The intermediation device of claim 13, wherein
the processor is configured to convert at least any of the one or more manipulation signals into one individual operating command for causing the selected robot to perform a plurality of operations.

18. The intermediation device of claim 13, wherein
the processor is configured to convert at least any of the one or more manipulation signals into the individual operating command for switching a control mode of the selected robot.

19. The intermediation device of claim 13, wherein
the processor is configured to request the selected manipulation terminal to determine a manipulation key assignment indicating how the plurality of manipulation keys are associated with the one or more individual operating commands, and convert the one or more manipulation signals corresponding to the plurality of manipulation keys into the one or more individual operating commands, and
wherein the processor is configured to convert, according to the manipulation key assignment determined by the selected manipulation terminal, the one or more manipulation signals into the one or more individual operating commands.

20. The intermediation device of claim 1, wherein
the processor is configured to perform the conversion from the manipulation signal to the operating command based on a model name received from each of the selected manipulation terminal and the selected-robot.

21. The intermediation device of claim 20, wherein
the processor is configured to store patterns of the signal conversion according to the model names of the manipulation terminal and the robot, and perform the signal conversion while applying the pattern corresponding to the model names of the selected manipulation terminal and the selected robot.

22. An intermediation device held by an intermediary and connected to a plurality of manipulation terminals operated by a plurality of remote workers and a plurality of robots held by one or more robot holders through a network in which data communication is possible, the intermediation device comprising:
a processor configured to:
receive, from the plurality of robots, a recruitment guideline for the remote workers who operate the plurality of robots and perform a plurality of works, the recruitment guideline including information indicating a robot type and information indicating a content of work,
receive, from the plurality of manipulation terminals, job applications of the plurality of remote workers who operate the plurality of manipulation terminals, and
compare the plurality of recruitment guidelines with the plurality of job applications, and select the one or more robots and the one or more manipulation terminals corresponding to the recruitment guidelines and the job applications satisfying items of each other, as one or more selected robots and one or more selected manipulation terminals, and connect the one or more selected manipulation terminals to the one or more selected robots so that the one or more selected robots are manipulatable by the one or more selected manipulation terminals, each of the job applications including information indicating a robot type, information indicating a content of work and information indicating a type of manipulation terminal, wherein each of the plurality of robots operates according to an operating command including an individual operating command, each of the plurality of manipulation terminals is provided with a manipulation key, when a manipulation signal corresponding to the manipulation key is received from the selected manipulation terminal for the selected manipulation terminal and the selected robot connected with each other among the one or more selected manipulation terminals and the one or more selected robots, the processor is configured to convert the manipulation signal into the individual operating command and sends the individual operating command to the selected robot, the plurality of manipulation keys include a move key configured to move a manipulation target and a function key used for multiple purposes, the operating command includes, as the individual operating command, a position command for instructing a position of a wrist part of each of the robots, and an end effector operating command for controlling operation of an end effector attached to the wrist part of each of the robots, and the processor is configured to convert the manipulation signal corresponding to the move key into the position command and converts the manipulation signal corresponding to the function key into the end effector operating command.

23. The intermediation device of claim 22, wherein the processor is configured to send a notice of rejection for display on a manipulation terminal that is not selected.

24. An intermediating method using an intermediation device held by an intermediary and connected to a plurality of manipulation terminals operated by a plurality of remote workers and a plurality of robots held by one or more robot holders through a network in which data communication is possible, the method comprising:

receiving by a processor of the intermediation device, from the plurality of robots, recruitments of the remote workers who operate the plurality of robots and perform a plurality of works, each of the recruitments including information indicating a robot type and information indicating a content of work;

posting by the processor of the intermediation device, the recruitments of the remote workers who perform the plurality of works on a site on the network of the intermediary who holds the intermediation device;

when the plurality of remote workers access the site from the plurality of manipulation terminals and send a plurality of applications for the recruitments of the remote workers who perform the plurality of works, selecting by the processor of the intermediation device, based on the plurality of applications in comparison to the information included in the recruitments, one or more robots and one or more manipulation terminals as one or more selected robots and one or more selected manipulation terminals, each of the applications including information indicating a robot type, information indicating a content of work and information indicating a type of manipulation terminal; and connecting by the processor of the intermediation device, the one or more selected manipulation terminals to the one or more selected robots so that the one or more selected robots are manipulatable by the one or more selected manipulation terminals, wherein each of the plurality of robots operates according to an operating command including an individual operating command, and each of the plurality of manipulation terminals is provided with a manipulation key, the method further comprises, when the processor of the intermediation device receives a manipulation signal corresponding to the manipulation key from the selected manipulation terminal for the selected manipulation terminal and the selected robot connected with each other among the one or more selected manipulation terminals and the one or more selected robots, converting by the processor of the intermediation device, the manipulation signal into the individual operating command and sending the individual operating command to the selected robot, the plurality of manipulation keys include a move key configured to move a manipulation target and a function key used for multiple purposes, and the operating command includes, as the individual operating command, a position command for instructing a position of a wrist part of each of the robots, and an end effector operating command for controlling operation of an end effector attached to the wrist part of each of the robots, and the method further comprises converting by the processor of the intermediation device, the manipulation signal corresponding to the move key into the position command and converting the manipulation signal corresponding to the function key into the end effector operating command.

25. The intermediating method of claim 24, comprising connecting by the processor of the intermediation device, according to a mode of the plurality of works, the one or more selected manipulation terminals to the one or more selected robots in a relation in which a ratio of the one or more selected manipulation terminals and the one or more selected robots is at least one of 1:1, n:1 (n is a natural number of two or larger), 1:m (m is a natural number of two or larger), and n:m.

26. The intermediating method of claim 24, comprising determining by the processor of the intermediation device for one of the recruitments, according to items of the recruitment for the remote workers who perform the plurality of works, the one or more selected manipulation terminals and the one or more selected robots, in an order of receiving the applications, or by a selection from the plurality of applications.

27. The intermediating method of claim 24, comprising connecting by the processor of the intermediation device, the one or more selected manipulation terminals to the one or more selected robots, immediately or at a time in the future, according to a work period presented in the recruitment corresponding to each of the selected robots.

28. The intermediating method of claim 24, comprising disconnecting by the processor of the intermediation device, the one or more selected manipulation terminals from the one or more selected robots according to respective notices from the one or more selected manipulation terminals.

29. The intermediating method of claim 24, wherein items of the recruitments for the remote workers who perform the plurality of works include information related to a content of each of the plurality of works, a level of skill required for each of the plurality of works, and a reward for each of the plurality of works.

30. The intermediating method of claim 24, wherein the plurality of manipulation terminals are at least any of a game machine, a game controller, a remote controller dedicated for the robot, a personal digital assistant, a smartphone, a personal computer, and a tablet.

31. The intermediating method of claim 24, comprising managing by the processor of the intermediation device, a system related to qualifications required for the plurality of works or a ranking system in which the remote workers who perform the plurality of works are ranked.

32. The intermediating method of claim 31, comprising managing by the processor of the intermediation device, a training meeting for acquiring the qualification.

33. The intermediating method of claim 24 comprising giving by the processor of the intermediation device, a training or a simulation for well operating the robot.

34. The intermediating method of claim 24, comprising managing by the processor of the intermediation device, an event where the plurality of remote workers gather.

35. The intermediating method of claim 24, comprising converting by the processor of the intermediation device, at least any of the one or more manipulation signals into the individual operating command for switching a control mode of the selected robot.

36. The intermediating method of claim 24, further comprising
sending, by the processor, a notice of rejection for display on a manipulation terminal that is not selected.

37. The intermediating method of claim 24, wherein the operating command includes one or more individual operating commands, and
wherein each of the manipulation terminals is provided with a plurality of manipulation keys,
the method comprising, when the processor of the intermediation device receives one or more manipulation signals corresponding to the plurality of manipulation keys, converting by the processor of the intermediation device, the one or more manipulation signals into one or more individual operating commands and sending the one or more individual operating commands to the selected robot.

38. The intermediating method of claim 37, comprising, when the processor of the intermediation device receives a manipulation key change notice from the selected manipulation terminal, changing by the processor of the intermediation device, according to the manipulation key change notice, the one or more individual operating commands to be changed from the one or more manipulation signals.

39. The intermediating method of claim 37, comprising, when the number of the plurality of manipulation keys of each of the manipulation terminals is short for the number of the one or more individual operating commands, converting by the processor of the intermediation device, each of the manipulation signals corresponding to operation in a given mode of one or more manipulation keys among the plurality of manipulation keys into the one or more individual operating commands.

40. The intermediating method of claim 37, comprising converting by the processor of the intermediation device, at least any of the one or more manipulation signals into the one or more individual operating commands for causing the selected robot to perform a plurality of operations.

41. The intermediating method of claim 37, comprising converting by the processor of the intermediation device, at least any of the one or more manipulation signals into one individual operating command for causing the selected robot to perform a plurality of operations.

42. The intermediating method of claim 37, comprising:
requesting by the processor of the intermediation device, the selected manipulation terminal to determine a manipulation key assignment indicating how the plurality of manipulation keys are associated with the one or more individual operating commands, and convert the one or more manipulation signals corresponding to the plurality of manipulation keys into the one or more individual operating commands; and
converting by the processor of the intermediation device, according to the manipulation key assignment determined by the selected manipulation terminal, the one or more manipulation signals into the one or more individual operating commands.

43. The intermediating method of claim 24, comprising performing by the processor of the intermediation device, the conversion from the manipulation signal to the operating command based on a model name received from each of the selected manipulation terminal and the selected robot.

44. The intermediating method of claim 43, comprising:
storing by the processor of the intermediation device, patterns of the signal conversion according to the model names of the manipulation terminal and the robot; and
performing by the processor of the intermediation device, the signal conversion while applying the pattern corresponding to the model names of the selected manipulation terminal and the selected robot.

45. An intermediating method using an intermediation device held by an intermediary and connected to a plurality of manipulation terminals operated by a plurality of remote workers and a plurality of robots held by one or more robot holders through a network in which data communication is possible, the method comprising:
receiving by the processor of the intermediation device, from the plurality of robots, a recruitment guideline for the remote workers who operate the plurality of robots and perform a plurality of works, the recruitment guideline including information indicating a robot type and information indicating a content of work;
receiving by the processor of the intermediation device, from the plurality of manipulation terminals, job applications of the plurality of remote workers who operate the plurality of manipulation terminals, each of the job applications including information indicating a robot type, information indicating a content of work and information indicating a type of manipulation terminal;
comparing by the processor of the intermediation device, the plurality of recruitment guidelines with the plurality of job applications, and selecting one or more robots and the one or more manipulation terminals corresponding to the recruitment guidelines and job applications satisfying items of each other, as one or more selected robots and one or more selected manipulation terminals; and connecting by the processor of the intermediation device, the one or more selected robots to the one or more selected manipulation terminals so that the one or more selected manipulation terminals are manipulatable by the one or more selected robots, wherein each of the plurality of robots operates according to an operating command including an individual operating command, and each of the plurality of manipulation terminals is provided with a manipulation key, the method further comprises, when the processor of the intermediation device receives a manipulation signal corresponding to the manipulation key from the selected manipulation terminal for the selected manipulation terminal and the selected robot connected with each other among the one or more selected manipulation terminals and the one or more selected robots, converting by the processor of the intermediation device, the manipulation signal into the individual operating command and sending the individual operating command to the selected robot, the plurality of manipulation keys include a move key configured to move a manipulation target and a function key used for multiple purposes, and the operating command includes, as the individual operating command, a position command for instructing a position of a wrist part of each of the robots, and an end effector operating command for controlling operation of an end effector attached to the wrist part of each of the robots, and the method further comprises converting by the processor of the intermediation device, the manipulation signal corresponding to the move key into the position command and converting the manipulation signal corresponding to the function key into the end effector operating command.

46. The intermediating method of claim 45, further comprising sending, by the processor, a notice of rejection for display on a manipulation terminal that is not selected.

* * * * *